US010054274B2

(12) United States Patent
Athalye et al.

(10) Patent No.: US 10,054,274 B2
(45) Date of Patent: Aug. 21, 2018

(54) DIRECT ATTACH CEILING-MOUNTED SOLID STATE DOWNLIGHTS

(71) Applicant: Cree, Inc., Durham, NC (US)

(72) Inventors: Praneet Jayant Athalye, Morrisville, NC (US); Randy Bernard, Cary, NC (US); Nathan Snell, Raleigh, NC (US); William L. Dungan, Cary, NC (US)

(73) Assignee: Cree, Inc., Durham, NC (US)

( * ) Notice: Subject to any disclaimer, the term of this patent is extended or adjusted under 35 U.S.C. 154(b) by 439 days.

(21) Appl. No.: 14/699,172

(22) Filed: Apr. 29, 2015

(65) Prior Publication Data

US 2015/0233537 A1     Aug. 20, 2015

Related U.S. Application Data

(63) Continuation-in-part of application No. 13/787,727, filed on Mar. 3, 2013, now Pat. No. 9,310,038, which
(Continued)

(51) Int. Cl.
| | |
|---|---|
| *F21S 8/02* | (2006.01) |
| *F21V 3/04* | (2018.01) |
| *F21V 7/00* | (2006.01) |
| *F21V 7/04* | (2006.01) |
| *F21V 21/04* | (2006.01) |

(Continued)

(52) U.S. Cl.
CPC ............... *F21S 8/026* (2013.01); *F21V 3/04* (2013.01); *F21V 7/0066* (2013.01); *F21V 7/041* (2013.01); *F21S 8/04* (2013.01); *F21V 3/02* (2013.01); *F21V 7/22* (2013.01); *F21V 21/04* (2013.01); *F21V 21/044* (2013.01); *F21V 23/005* (2013.01); *F21V 23/023* (2013.01); *F21V 29/15* (2015.01); *F21Y 2115/10* (2016.08); *H05B 33/0815* (2013.01)

(58) Field of Classification Search
None
See application file for complete search history.

(56) References Cited

U.S. PATENT DOCUMENTS

| | | |
|---|---|---|
| D85,382 S | 10/1931 | Guth |
| 2,675,466 A | 4/1954 | Frederick |
| | (Continued) | |

FOREIGN PATENT DOCUMENTS

| | | |
|---|---|---|
| CN | 101188261 A | 5/2008 |
| CN | 201069133 Y | 6/2008 |
| | (Continued) | |

OTHER PUBLICATIONS

"Approved Method: Measuring Lumen Maintenance of LED Light Sources," IES Illuminating Engineering Society, IES LM-80-08, Sep. 22, 2008, 10 pages.
(Continued)

*Primary Examiner* — Britt D Hanley
(74) *Attorney, Agent, or Firm* — Myers Bigel, P.A.

(57) ABSTRACT

Solid state downlights include a fixture that has a solid state lighting housing, a plurality of light emitting diodes within the solid state lighting housing and a junction box, and at least one mounting structure that is configured to releasably attach the fixture directly to a ceiling to mount the fixture within an opening in the ceiling.

19 Claims, 16 Drawing Sheets

Related U.S. Application Data is a continuation-in-part of application No. 13/429,080, filed on Mar. 23, 2012, now Pat. No. 9,494,294.

(60) Provisional application No. 61/672,020, filed on Jul. 16, 2012, provisional application No. 61/676,310, filed on Jul. 26, 2012.

(51) Int. Cl.

| | | |
|---|---|---|
| *F21S 8/04* | (2006.01) | |
| *F21V 3/02* | (2006.01) | |
| *F21V 7/22* | (2018.01) | |
| *F21V 23/00* | (2015.01) | |
| *F21V 23/02* | (2006.01) | |
| *H05B 33/08* | (2006.01) | |
| *F21V 29/15* | (2015.01) | |
| *F21Y 115/10* | (2016.01) | |

(56) References Cited

U.S. PATENT DOCUMENTS

| | | |
|---|---|---|
| 3,302,918 A | 2/1967 | Cohen |
| 3,381,124 A | 4/1968 | Eisenberg |
| 4,044,246 A | 8/1977 | Docimo |
| 4,302,798 A | 11/1981 | Sit |
| 5,025,356 A | 6/1991 | Gawad |
| 5,546,291 A | 8/1996 | Simes |
| 5,823,663 A | 10/1998 | Bell et al. |
| D407,473 S | 3/1999 | Wimbock |
| 6,127,783 A | 10/2000 | Marshall |
| 6,155,699 A | 12/2000 | Miller et al. |
| 6,210,025 B1 | 4/2001 | Schmidt et al. |
| 6,234,643 B1 | 5/2001 | Licheon, Jr. |
| 6,443,598 B1 | 9/2002 | Morgan |
| 6,523,974 B2 | 2/2003 | Engel |
| 6,545,216 B1 | 4/2003 | Bell |
| D496,121 S | 9/2004 | Santoro |
| 6,871,983 B2 | 3/2005 | Jacob et al. |
| 6,948,840 B2 | 9/2005 | Grenda et al. |
| 7,021,797 B2 | 4/2006 | Minano et al. |
| 7,025,477 B2 | 4/2006 | Blessing |
| 7,049,761 B2 | 5/2006 | Timmermans et al. |
| 7,102,172 B2 | 9/2006 | Lynch |
| 7,125,146 B2 | 10/2006 | Willis |
| 7,213,940 B1 | 5/2007 | Van de Ven et al. |
| 7,237,924 B2 | 7/2007 | Martineau et al. |
| D556,358 S | 11/2007 | Santoro |
| 7,338,182 B1 | 3/2008 | Hastings et al. |
| 7,374,327 B2 | 5/2008 | Schexnaider |
| 7,510,299 B2 | 3/2009 | Timmermans et al. |
| 7,520,636 B2 | 4/2009 | Van der Poel |
| D593,246 S | 5/2009 | Fowler et al. |
| 7,594,736 B1 | 9/2009 | Kassay et al. |
| D604,446 S | 11/2009 | Fowler et al. |
| 7,614,769 B2 | 11/2009 | Sell |
| 7,618,157 B1 | 11/2009 | Galvez et al. |
| 7,618,160 B2 | 11/2009 | Chinnish et al. |
| D608,932 S | 1/2010 | Castelli |
| 7,654,702 B1 | 2/2010 | Ding et al. |
| 7,661,844 B2 | 2/2010 | Sekiguchi et al. |
| D611,183 S | 3/2010 | Duarte |
| 7,670,021 B2 | 3/2010 | Chou |
| 7,674,005 B2 | 3/2010 | Chung et al. |
| 7,686,470 B2 | 3/2010 | Chiang |
| 7,686,484 B2 | 3/2010 | Heiking et al. |
| 7,712,918 B2 | 5/2010 | Siemiet et al. |
| 7,722,220 B2 | 5/2010 | Van de Ven |
| 7,722,227 B2 | 5/2010 | Zhang |
| D617,487 S | 6/2010 | Fowler et al. |
| 7,768,192 B2 | 8/2010 | Van de Ven et al. |
| 7,771,085 B2 | 8/2010 | Kim |
| 7,794,114 B2 | 9/2010 | Medendorp |
| 7,810,736 B2 | 10/2010 | Smith |
| 7,815,338 B2 | 10/2010 | Siemist et al. |
| 7,828,465 B2 | 11/2010 | Roberts |
| 7,828,468 B2 | 11/2010 | Mayfield et al. |
| 7,854,616 B2 | 12/2010 | Janos |
| D633,247 S | 2/2011 | Kong et al. |
| 7,906,793 B2 | 3/2011 | Negley |
| 7,918,591 B2 | 4/2011 | Lynch |
| 7,950,832 B2 | 5/2011 | Tanaka |
| 7,980,736 B2 | 7/2011 | Soderman |
| 7,988,321 B2 | 8/2011 | Wung et al. |
| 7,988,335 B2 | 8/2011 | Liu et al. |
| 7,993,034 B2 | 8/2011 | Wegner |
| 7,997,762 B2 | 8/2011 | Wang et al. |
| 8,022,641 B2 | 9/2011 | Janik |
| 8,038,314 B2 | 10/2011 | Ladewig |
| 8,070,326 B2 | 12/2011 | Lee |
| D653,376 S | 1/2012 | Kong et al. |
| 8,092,042 B2 | 1/2012 | Wilcox |
| 8,092,049 B2 | 1/2012 | Kinnune et al. |
| 8,162,504 B2 | 4/2012 | Zhang et al. |
| 8,186,855 B2 | 5/2012 | Wassel et al. |
| 8,201,968 B2 | 6/2012 | Maxik et al. |
| 8,215,799 B2 | 7/2012 | Venden Eynden et al. |
| 8,232,739 B2 | 7/2012 | Underwood |
| 8,246,203 B2 | 8/2012 | Hancock |
| 8,256,919 B2 | 9/2012 | Holder |
| 8,256,927 B2 | 9/2012 | Hu et al. |
| 8,317,354 B2 | 11/2012 | Gassner et al. |
| D684,291 S | 6/2013 | Goelz et al. |
| 8,480,252 B2 | 7/2013 | Bertram et al. |
| 8,506,135 B1 | 8/2013 | Oster |
| 8,529,102 B2 | 9/2013 | Pickard et al. |
| 8,591,058 B2 | 11/2013 | Conception |
| 8,591,071 B2 | 11/2013 | Hochstein |
| 8,641,243 B1 | 2/2014 | Rashidi |
| 8,680,783 B2 | 3/2014 | Athalye et al. |
| 8,810,144 B2 | 8/2014 | Hu et al. |
| 8,853,958 B2 | 10/2014 | Athalye et al. |
| 8,882,311 B2 | 11/2014 | Snell |
| 9,048,396 B2 | 6/2015 | Lowes et al. |
| 9,062,830 B2 | 6/2015 | Le et al. |
| 9,151,457 B2 | 10/2015 | Pickard et al. |
| 2004/0001344 A1 | 1/2004 | Hecht |
| 2004/0085779 A1 | 5/2004 | Pond et al. |
| 2005/0264716 A1 | 12/2005 | Kim et al. |
| 2006/0077684 A1 | 4/2006 | Yuen |
| 2006/0262521 A1 | 11/2006 | Piepgras et al. |
| 2006/0291206 A1 | 12/2006 | Angelini et al. |
| 2007/0041220 A1 | 2/2007 | Lynch |
| 2007/0109779 A1 | 5/2007 | Sekiguchi et al. |
| 2007/0115670 A1 | 5/2007 | Roberts et al. |
| 2007/0115671 A1 | 5/2007 | Roberts et al. |
| 2007/0211457 A1 | 9/2007 | Mayfield et al. |
| 2007/0230172 A1 | 10/2007 | Wang |
| 2007/0253205 A1 | 11/2007 | Welker |
| 2007/0297181 A1 | 12/2007 | Mayfield et al. |
| 2008/0049422 A1 | 2/2008 | Trenchard et al. |
| 2008/0122364 A1 | 5/2008 | McClellan |
| 2008/0170398 A1 | 7/2008 | Kim |
| 2008/0232093 A1 | 9/2008 | Kim |
| 2008/0232116 A1 | 9/2008 | Kim |
| 2008/0278943 A1 | 11/2008 | Van der Poel |
| 2009/0086476 A1* | 4/2009 | Tickner ............... F21S 8/02 362/231 |
| 2009/0161356 A1 | 6/2009 | Negley et al. |
| 2009/0196024 A1 | 8/2009 | Heiking et al. |
| 2009/0225543 A1 | 9/2009 | Jacobson et al. |
| 2009/0237958 A1 | 9/2009 | Kim |
| 2009/0262543 A1 | 10/2009 | Ho |
| 2009/0310354 A1 | 12/2009 | Zampini et al. |
| 2009/0323334 A1 | 12/2009 | Roberts et al. |
| 2010/0061108 A1 | 3/2010 | Zhang et al. |
| 2010/0097794 A1 | 4/2010 | Teng |
| 2010/0103678 A1 | 4/2010 | Van de Ven |
| 2010/0110679 A1 | 5/2010 | Teng et al. |
| 2010/0172133 A1 | 7/2010 | Lie |
| 2010/0188609 A1 | 7/2010 | Matsuki et al. |
| 2010/0254128 A1 | 10/2010 | Pickard et al. |
| 2010/0254145 A1 | 10/2010 | Yamaguchi |
| 2010/0254146 A1 | 10/2010 | McCanless |

(56) References Cited

U.S. PATENT DOCUMENTS

| | | |
|---|---|---|
| 2010/0270903 A1 | 10/2010 | Lin |
| 2010/0277905 A1 | 11/2010 | Janik et al. |
| 2010/0295468 A1 | 11/2010 | Pederson et al. |
| 2010/0327768 A1 | 12/2010 | Kong et al. |
| 2011/0032714 A1 | 2/2011 | Chang |
| 2011/0043132 A1 | 2/2011 | Kim et al. |
| 2011/0090671 A1 | 4/2011 | Bertram et al. |
| 2011/0141722 A1 | 6/2011 | Acampora et al. |
| 2011/0141734 A1 | 6/2011 | Li et al. |
| 2011/0156584 A1 | 6/2011 | Hyun |
| 2011/0156591 A1 | 6/2011 | Lin |
| 2011/0164417 A1 | 7/2011 | Huang |
| 2011/0199005 A1 | 8/2011 | Bretschneider et al. |
| 2011/0199769 A1 | 8/2011 | Bretschneider et al. |
| 2011/0246146 A1 | 10/2011 | Kauffman et al. |
| 2011/0267810 A1 | 11/2011 | Higman et al. |
| 2012/0038289 A1 | 2/2012 | Jee et al. |
| 2012/0051041 A1 | 3/2012 | Edmond et al. |
| 2012/0127714 A1 | 5/2012 | Rehn |
| 2012/0140442 A1 | 6/2012 | Woo et al. |
| 2012/0140461 A1 | 6/2012 | Pickard et al. |
| 2012/0182744 A1* | 7/2012 | Santiago ............ F21S 8/026 362/365 |
| 2012/0287616 A1* | 11/2012 | Wilcox ............... F21S 8/026 362/198 |
| 2013/0063015 A1 | 3/2013 | Concepcion |
| 2013/0134445 A1 | 5/2013 | Tarsa et al. |
| 2013/0235568 A1 | 9/2013 | Green et al. |
| 2013/0250567 A1 | 9/2013 | Edmond |
| 2013/0250579 A1 | 9/2013 | Athalye |
| 2013/0265750 A1 | 10/2013 | Pickard et al. |
| 2013/0294109 A1 | 11/2013 | Athalye |
| 2013/0328073 A1 | 12/2013 | Lowes et al. |
| 2014/0254199 A1 | 9/2014 | Athalye et al. |

FOREIGN PATENT DOCUMENTS

| | | |
|---|---|---|
| CN | 202580962 U | 12/2012 |
| DE | 102007030186 | 1/2009 |
| DE | 202010001832 U1 | 7/2010 |
| EP | 1298383 A2 | 4/2003 |
| EP | 1357335 A2 | 10/2003 |
| EP | 1653254 | 3/2006 |
| EP | 1737051 | 12/2006 |
| EP | 1847762 A2 | 10/2007 |
| EP | 1860467 | 11/2007 |
| EP | 1950491 | 7/2008 |
| EP | 2636945 A2 | 9/2013 |
| JP | 2002/244027 | 8/2002 |
| JP | 2004140327 | 5/2004 |
| JP | 2006/173624 | 6/2006 |
| JP | 2009/295577 | 12/2009 |
| JP | 2010/103687 | 5/2010 |
| JP | 2011/018571 | 8/2011 |
| JP | 2011/018572 | 8/2011 |
| WO | WO 2003/102467 | 12/2003 |
| WO | WO 2006/105346 | 3/2006 |
| WO | WO 2007/099860 | 9/2007 |
| WO | WO 2009/030233 | 3/2009 |
| WO | WO 2009/140761 A1 | 11/2009 |
| WO | WO 2009/157999 A1 | 12/2009 |
| WO | WO 2010/042216 A2 | 4/2010 |
| WO | WO 2011/074424 A1 | 6/2011 |
| WO | WO 2011/096098 A1 | 8/2011 |
| WO | WO 2011/098191 A1 | 8/2011 |
| WO | WO 2011/118991 A2 | 9/2011 |
| WO | WO 2011/140353 A2 | 11/2011 |

OTHER PUBLICATIONS

"Lighting Research Program Project 2.3 Low-profile LED Luminaries," by Narendran et al., Apr. 2007, Lighting Research Program, California Energy Commission, 83 pages.

"Next Generation Luminaires Showcase," NGL 2009, IES/IALD/US Dept. of Energy, 51 pages.

"Assist Recommends . . . LED Life for General Lighting: Definition of Life," vol. 1, Issue 1, Feb. 2005, 33 pages.

"Controlling LED lighting systems: introducing the LED driver," 2004, Craig DelOuie, LED's Magazine, 5 pages.

CR100 Series (220-240V), 100mm LED Downlight, Printed from the Internet on Apr. 21, 2015 at http://www.cree.com/Liqhtinq/Products/International/Downlights/CR100-Series, 5 pages.

2013 Cree LED Lighting Catalog, 148 pages.

Cree XLamp XP-E LEDs, Product Family Data Sheet, 23 pages.

Cree XLamp XP-G LEDs, Product Family Data Sheet, 13 pages.

Energy Star® Program Requirements for Solid State Lighting Luminaires, Eligibility Criteria-Version 1.1, Final, Dec. 19, 2008, 23 pages.

LR6, LR6C Installation Instructions, Cree, Inc., 2013, 2 pages.

NLPIP Lighting Answers, vol. 7, Issue 3, May 2003, 23 pages.

Luminaires. A Pacific Energy center Factsheet, 1997, 7 pages.

Matsushita Electric Works Information Systems Co., Ltd., Annual Report 2007 for the Year Ended Mar. 31, 34 pages.

Philips eW Downlight Powercore gen 2, Surface-mounted LED downlight for general and accent lighting, Product Guide, Philips Color Kinetics, Dec. 19, 2012, 15 pages.

LR6, Six-Inch LED Downlight, Specification sheet, Cree, Inc., Dec. 19, 2012, 2 pages.

* cited by examiner

DIRECT ATTACH CEILING-MOUNTED SOLID STATE DOWNLIGHTS

CROSS-REFERENCE TO RELATED APPLICATIONS

The present application claims priority under 35 U.S.C. § 120 as a continuation-in-part of U.S. patent application Ser. No. 13/787,727, filed Mar. 6, 2013, which is a continuation-in-part of U.S. patent application Ser. No. 13/429,080, filed Mar. 23, 2012, and which further claims priority to U.S. Provisional Application Ser. No. 61/672,020, filed on Jul. 16, 2012 and U.S. Provisional Application Ser. No. 61/676,310, filed on Jul. 26, 2012. The entire content of each of the above applications is incorporated herein by reference as if set forth in their entireties.

FIELD

The present invention relates generally to solid state lighting fixtures and, more particularly, to ceiling-mounted solid state lighting fixtures.

BACKGROUND

Solid state lighting fixtures refer to lighting fixtures that generate light using light emitting diodes ("LEDs") or other solid state light emitters. There is a growing interest in the use of solid state lighting fixtures for a wide variety of applications due to their high energy efficiency as compared to traditional incandescent light sources and even as compared to fluorescent lighting. Solid state lighting fixtures are now available that exhibit very high efficiency levels (e.g., almost an order of magnitude more efficient than incandescent lighting), excellent color rendering properties, and lifetimes of as much as 20,000 hours, which is an order of magnitude greater than most conventional incandescent light bulbs.

Solid state lighting fixtures typically are powered by a direct current ("DC") electrical signal. Accordingly, most solid state lighting fixtures include an integrated power conversion circuit that converts the alternating current ("AC") electrical signal that is provided in most homes and buildings into a DC electrical signal. Additionally, as excessive heat can significantly reduce the expected lifetime of a solid state lighting fixture, most such fixtures include various heat sinking structures. The power conversion circuitry and heat sink structures may increase the cost of solid state lighting fixtures. For these and other reasons, most solid state lighting fixtures are more expensive than corresponding incandescent and fluorescent lighting fixtures. Accordingly, there is interest in reducing the costs of manufacturing and installing solid state lighting fixtures.

SUMMARY

Pursuant to some embodiments of the present invention, solid state downlights are provided that include a fixture that has a solid state lighting housing, a plurality of light emitting diodes within the solid state lighting housing and a junction box, and at least one mounting structure that is configured to releasably attach the fixture directly to a ceiling to mount the fixture within an opening in the ceiling.

In some embodiments, the at least one mounting structure may be a pair of spring mounting arms, and the solid state lighting housing may include a lip that is at least partially below the ceiling when the solid state downlight is installed in the ceiling. In such embodiments, each spring mounting arm may include a spring section that directly engages a sidewall of the opening in the ceiling. The spring mounting arms are configured to hold the fixture within the opening for ceilings having thickness in the range from 0.375 inches to 0.675 inches.

In some embodiments, the junction box may be mounted above the solid state lighting housing, and the solid state downlight may further include a driver housing that includes a driver circuit that is mounted above the solid state lighting housing. In some such embodiments, the junction box and the driver housing may be mounted side-by-side on a top surface of the solid state lighting housing. A top surface of the junction box overlies the driver housing. A pair of electrical leads may extend from the driver housing into an interior of the junction box.

In some embodiments, the junction box may be detachably mounted to the solid state lighting housing. The junction box may include a first wire opening with a resiliently deflectable cover. The resiliently deflectable cover may be configured to engage an external electrical wire that enters the junction box through the wire opening to provide strain relief. The junction box may also include a second wire opening that provides an access point for a second external electrical wire to enter the junction box.

In some embodiments, the solid state downlight may further include a wire termination terminal that is at least partly within the junction box. This wire connection terminal may be configured to connect a power supply conductor and a return conductor of an external electrical wire to respective ones of a pair of electrical leads that are connected to a driver circuit that is located in the driver housing.

In some embodiments, the junction box may be mounted to the fixture via a flexible wire conduit, and a pair of electrical leads that are connected to the driver circuit may extend through the flexible wire conduit to the junction box.

In some embodiments, the at least one mounting structure may be a mounting ring and a plurality of associated spring clips. The mounting ring may include a lip having a diameter that is greater than a diameter of the opening in the ceiling. A first portion of a first of the spring clips may be configured to hold the lip of the mounting ring against a lower surface of the ceiling and a second portion of the first of the spring clips may be configured to directly engage an upper surface of the ceiling. The first of the spring clips may include a plurality of teeth that are configured to engage the solid state lighting housing when the fixture is installed in the mounting ring within the opening in the ceiling.

Pursuant to further embodiments of the present invention, solid state downlight fixtures are provided for mounting within an opening in a ceiling that include a solid state lighting housing having a top surface, at least one sidewall extending downwardly from the top surface and a lower lip extending outwardly from the bottom of the at least one sidewall, a plurality of light emitting diodes mounted within the solid state lighting housing, a junction box releasably attached to the top surface of the solid state lighting housing, the junction box including a wire opening, a driver housing on the top surface of the solid state lighting housing, and a driver circuit in the driver housing, the driver circuit including first and second leads that extend into the junction box. The junction box and the driver housing are arranged side-by-side on the top surface of the solid state lighting housing.

In some embodiments, the solid state downlight fixture may further include a resiliently deflectable cover that covers the wire opening. The junction box may also include a second wire opening and a second resiliently deflectable cover that covers the second wire opening. At least one mounting structure may also be provided that is configured to releasably attach the fixture directly to the ceiling to mount the fixture within the opening in the ceiling. The at least one mounting structure may be, for example, a pair of spring mounting arms that are configured to directly engage a sidewall of the opening in the ceiling when the solid state downlight fixture is mounted within the opening in the ceiling, and the solid state lighting housing may include a lip that is mounted at least partially below the ceiling.

Pursuant to still further embodiments of the present invention, methods of installing a solid state downlight in an opening in a ceiling are provided where the solid state downlight includes a fixture that comprises a solid state lighting housing and a junction box that is mounted to the solid state lighting housing and a pair of spring mounting arms that are attached to the fixture. Pursuant to these methods, an external electrical wire that includes a power supply conductor and a return conductor is routed through a wire opening in the junction box into an interior of the junction box. The power supply conductor and the return conductor are electrically connected to respective first and second electrical leads that are electrically connected to the light emitting diodes and that extend into the interior of the junction box. The junction box is moved into a closed position. A top portion of the fixture and the spring mounting arms are then inserted through an opening in the ceiling so that the spring mounting arms directly contact the ceiling to mount the fixture within the opening in the ceiling.

DETAILED DESCRIPTION

Pursuant to embodiments of the present invention, solid state downlights are provided that can be mounted directly to the ceiling of a room in which the downlights are to be installed without any need for an installer to first install a sheet metal lighting "can" in the ceiling as is the case with conventional incandescent, fluorescent and solid state downlights. In particular, the solid state downlights according to embodiments of the present invention may include an integrated junction box in which an external electrical wire that runs through the ceiling of the building can be connected to electrical leads of the solid state downlight to provide power to the solid state downlight. Since the junction box may be designed to comply with local regulations governing electrical wiring, fire safety and the like, a sheet metal lighting can may not be required. Additionally, the solid state downlights according to embodiments of the present invention may be designed to be mounted directly to the ceiling as opposed to being mounted in a sheet metal lighting can or to some other structure such as a frame for a drop ceiling. In some embodiments, the solid state downlights may be designed so that they can be mounted to ceilings having a variety of different thicknesses. The solid state downlights according to embodiments of the present invention may be smaller, lighter weight and less costly as compared to conventional solid state downlights, and may be simpler to install.

In some embodiments, the solid state downlight may include strain relief to reduce the likelihood that the connection between the external electrical wire and the electrical leads may be pulled apart by axial forces. Additionally, the junction boxes may be designed to facilitate electrically connecting a plurality of the solid state downlights in series. The solid state downlights according to embodiments of the present invention may also have separate solid state lighting housings, driver housings and junction boxes, and hence may be designed so that an installer can only access portions of the downlight for which access is required, such as the junction box.

Example embodiments of the present invention will now be described with reference to the figures.

FIGS. 1-6 illustrate a lighting device 100 according to certain embodiments of the present invention.

Figures 1, 2:
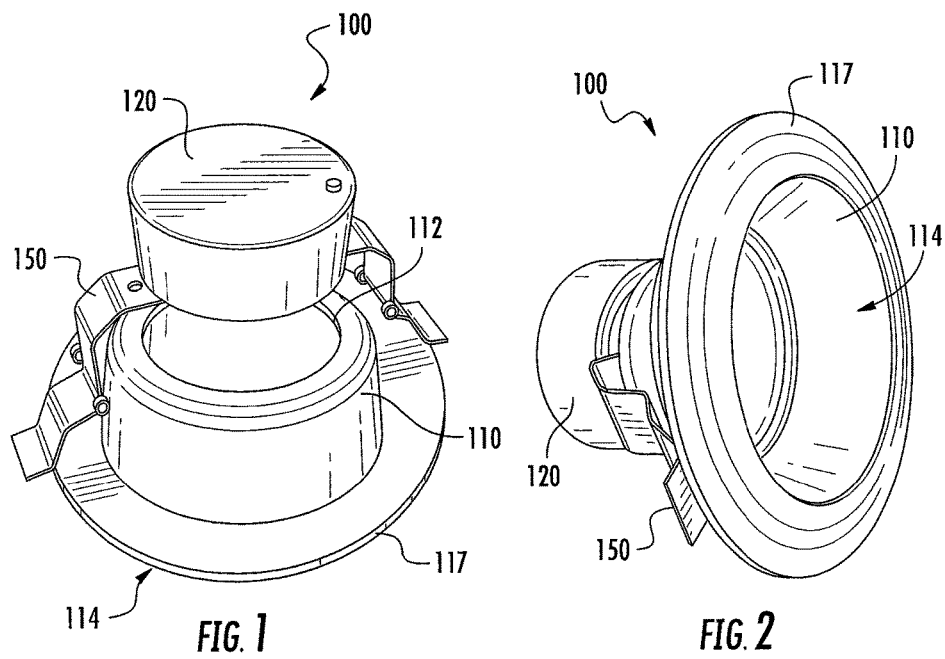
FIG. 1 is a top perspective view of a lighting device according to an embodiment of the present invention.
FIG. 2 is a side perspective view of the lighting device of FIG. 1.

FIG. 1 is a top perspective view of a lighting device 100. The lighting device 100 may be a ceiling-mounted solid state downlight. The lighting device 100 includes a solid state lighting housing 110 comprising a base 112 and an open end 114 through which light is emitted during operation. The open end 114 includes an outwardly extending lip 117. A junction box 120 is detachably mounted to the solid state lighting housing 110. A pair of mounting structures 150 in the form of spring mounting arms are attached to the junction box 120 and may be used to mount the lighting device 100 to a ceiling 170 (see FIG. 6). The ceiling 170 may comprise, for example, a drywall ceiling that has an opening 172 therein for the downlight 100 or a ceiling tile including such an opening 172. The junction box 120 may be easily detachable and re-attachable to the base 112 of the solid state lighting housing 110. Because the mounting structures 150 in the form of spring mounting arms may be used to mount the lighting device 100 to the ceiling drywall or insulation tile, the need to mount the lighting device 100 in a conventional sheet metal lighting "can" that is mounted above the ceiling 170 may be eliminated.

Figure 6:
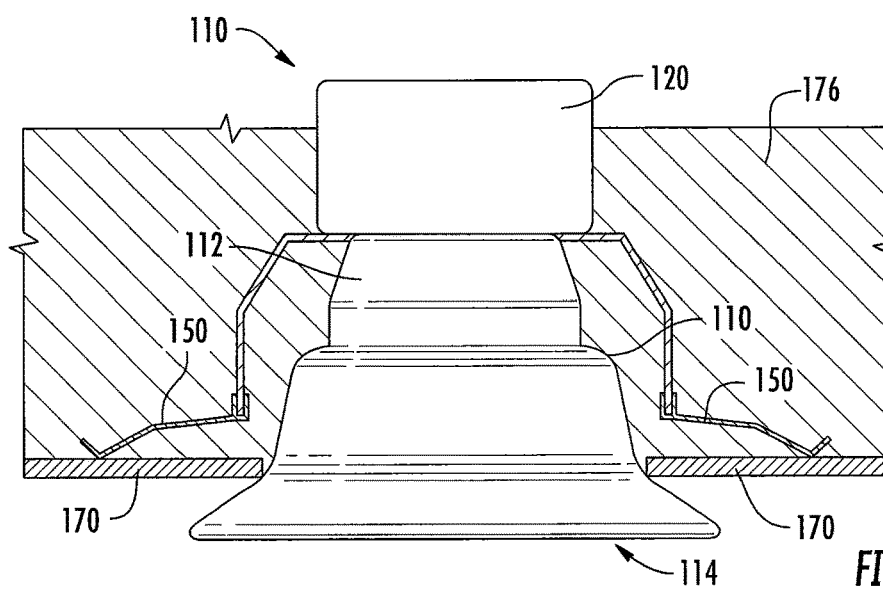
FIG. 6 is a cross-sectional view of the lighting device of FIG. 1 mounted in an opening in a ceiling.

The lighting device 100, as well as other embodiments of the present invention disclosed herein, may provide a variety of advantages over traditional ceiling mounted solid state downlights. During remodeling of a commercial or residential space, for example, it may not initially be known that there is not enough space or that there may be obstructions (e.g., piping, wiring, ductwork) that would prevent the use of a conventional sheet metal lighting "can" in the ceiling 170. Accordingly, in many instances, this lack of space for a lighting can is only discovered after an opening has been cut in the ceiling 170. Embodiments of the present invention may eliminate the need for the lighting can altogether. In addition to increasing the number of locations in a ceiling 170 where a downlight may be located, the elimination of the lighting can may also reduce material and installation costs. For example, attaching a junction box 120 to the solid state lighting housing 110 provides enough space to terminate the electrical wiring. The junction box 120 may be detachable allowing for easy maintenance or replacement. In some embodiments, the junction box 120 may alternatively be located on the side of the solid state lighting housing 110 to minimize the height of the lighting device 100. The lighting device 100 may include spring mounting arms 150 that are used to mount the fixture directly to the ceiling tile or drywall (as shown in FIG. 6). Since solid state light sources are efficient and the temperature range of the lighting device 100 is within safe limits, insulation can be placed around it. Thus, embodiments of the present invention may pose less of a fire hazard than typical incandescent downlights. Additionally, embodiments of the present invention may allow for quicker installation and subsequent safety inspection.

Figure 3:
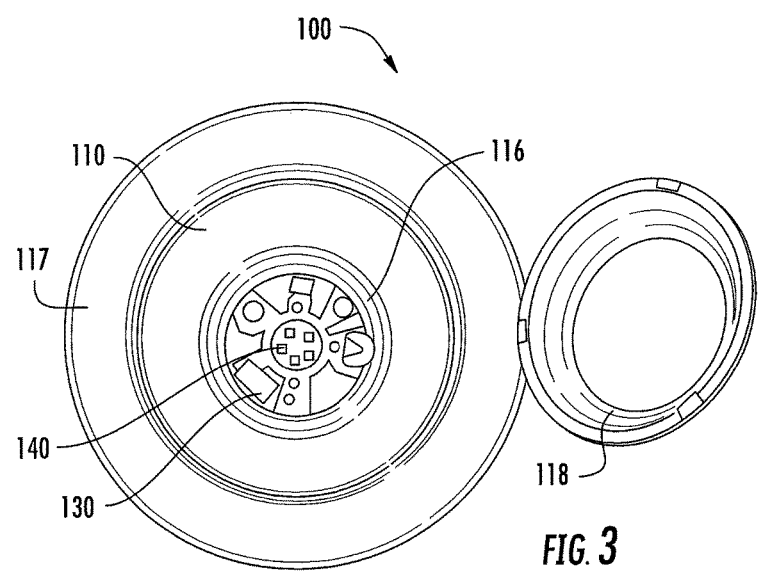
FIG. 3 is a bottom view of the lighting device of FIG. 1 with a portion thereof removed to expose internal elements.

FIG. 2 is a side perspective view of the lighting device 100. The interior surface of the solid state lighting housing 110 is shaped to define an optical chamber 116. The interior surface of the housing 110 is reflective and shaped to redirect light out of the open end 114 to create a desired light output profile. A reflector cone 118 fits inside the housing 110 and functions to cover a driver circuit 130 and any other light absorptive elements at the base 112 of the housing 110, as best shown in FIG. 3. The interior surface of reflector cone 118 may be shaped to create a smooth surface transition at the intersection with the interior surface of the solid state lighting housing 110. The reflector cone 118 can be held in place inside the solid state lighting housing 110 using, for example, an adhesive, screws, or a snap-fit groove structure.

FIG. 3 is a bottom view of the lighting device 100, looking into the open end 114 with the reflector cone 118 removed to expose the elements disposed in the base 112. This particular embodiment includes five LEDs 140 that are disposed at the base 112 in the optical chamber 116. There can be more or fewer than five light sources in other embodiments. Here, the LEDs 140 and the driver circuit 130 are on a single circuit board with the LEDs 140 disposed in the middle portion of the circuit board and surrounded by elements of the driver circuit 130 which powers and controls the output of the LEDs 140. Many driver circuits may be used, with some suitable circuits discussed in more detail herein. In other embodiments the LEDs 140 and the driver circuit 130 may be mounted on separate circuit boards. As shown, both the LEDs 140 and the drive circuit 130 are housed within the optical chamber 116. This compact arrangement obviates the need for a separate recessed lighting can that is commonly used for 4" and 6" ceiling-mounted downlights. Thus, lighting devices according to embodiments of the present invention may be are lighter weight, have reduced height, and easier to install as compared to conventional downlights.

In FIG. 3, the reflector cone 118 is shown removed from the solid state lighting housing 110. The reflector cone 118 includes a hole that aligns with the LEDs 140 when the reflector cone 118 is mounted inside the solid state lighting housing 110. In some embodiments, the LEDs 140 may protrude through the hole in the reflector cone 118 and into the optical chamber 116. Thus, when mounted in the optical chamber 116, the reflector cone 118 reduces or prevents light emitted from the LEDs 140 from being absorbed by absorptive elements of the drive circuit 130 by shielding those absorptive elements from the rest of the optical chamber 116. In this particular embodiment, a flange of reflector cone 118 is mounted with screws or pins to a ridge within the interior of the housing 110. In some embodiments the reflective cone 118 may be omitted for cost savings, and the drive circuit 130 may be covered by a reflective paint. Other structures and/or materials may also be used to reflect light away from the drive circuit 130.

Figure 4:
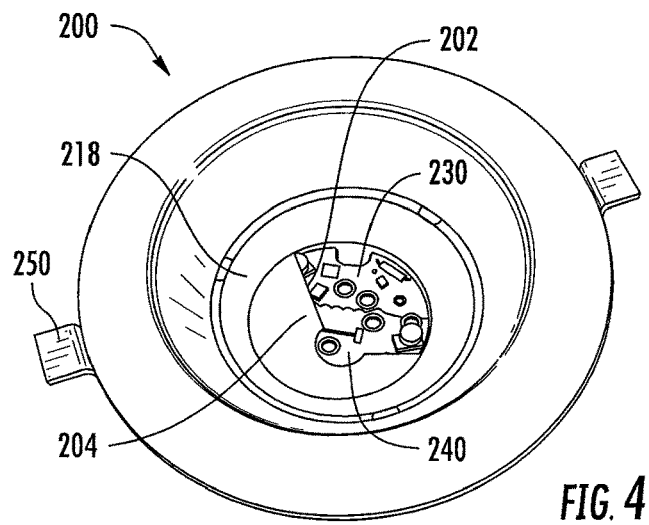
FIG. 4 is a bottom perspective view of a revised embodiment of the lighting device of FIG. 1.

FIG. 4 is a perspective view of a lighting device 200 according to embodiments of the present invention that is a modified version of the lighting device 100. In the view of FIG. 4, a portion of the reflector cone 218 has been removed to reveal the elements beneath. This particular embodiment comprises LEDs 240 on a first circuit board 202 and the driver circuit 230 on a second circuit board 204. The first circuit board 202 is under the second circuit board 204 with a spacer (not shown) between the two boards 202, 204 to provide electrical isolation. All of the driver circuit 230 elements are on one half of the second board 204. The other half 204 comprises a piece of metal, such as copper, for thermal dissipation. The LEDs 240 are on the first board 202 and protrude up through the cutout portion of the second board 204 as shown. The LEDs 240 then further protrude up through the hole in the reflector cone 218 (not shown due to the removed portions of the reflector cone 218 in this figure). In this embodiment, spring clips 250 are used to mount the device 200 to the ceiling drywall or the insulation tile, although other mount structures may be suitable.

Figure 5:
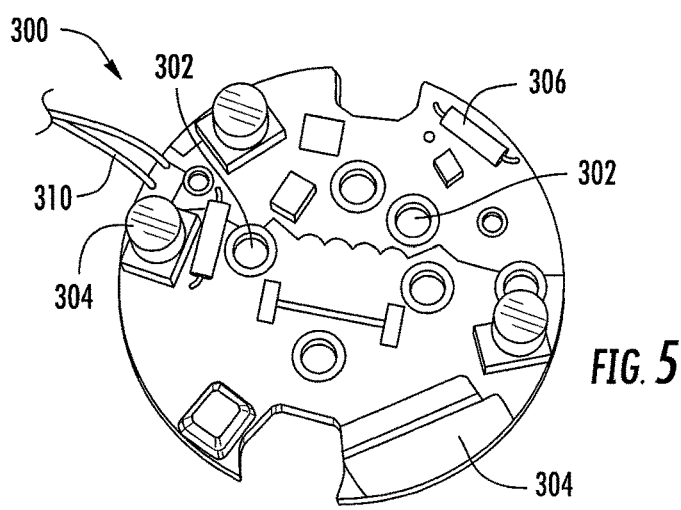
FIG. 5 is a top view of a circuit element that may be used in lighting devices according to embodiments of the present invention.

FIG. 5 is a top view of a circuit element 300 that may be used in lighting devices according to embodiments of the present invention such as, for example, the lighting device 100 of FIGS. 1-3. The circuit element 300 comprises a circuit board 306 on which a plurality of LEDs 302 (e.g., the LEDs 140 of lighting device 100) and various driver circuit components 304 (e.g., the driver circuit 130 of lighting device 100) are disposed. In this embodiment, the LEDs 302 and the driver circuit components 304 are disposed on the same circular circuit board 306. The circuit board 306 may be shaped to fit in the base of the solid state lighting housing of the lighting device. The driver circuit components 304 are arranged around the perimeter of the circuit board 306 with the LEDs 302 in the middle portion. Electrical leads 310 connect the LEDs 302 and the driver circuit 304 to an external power source through a junction box in some embodiments.

FIG. 6 is a cross-sectional view of the lighting device 100 of FIGS. 1-3 in one mount configuration according to embodiments of the present invention. In this configuration the base 112 of the solid state lighting housing 110 protrudes through the ceiling 170 into the plenum. The open end 114 of the solid state lighting housing 110 is exposed beneath the ceiling 170 so the light is emitted into the room below. The spring clips 150 urge the open end 114 of the solid state lighting housing 110 up against the ceiling 170, holding the lighting device 100 firmly against the ceiling 170. The portion of the lighting device 100 in the plenum above the ceiling 170 may be surrounded by insulation 176.

Figure 7:
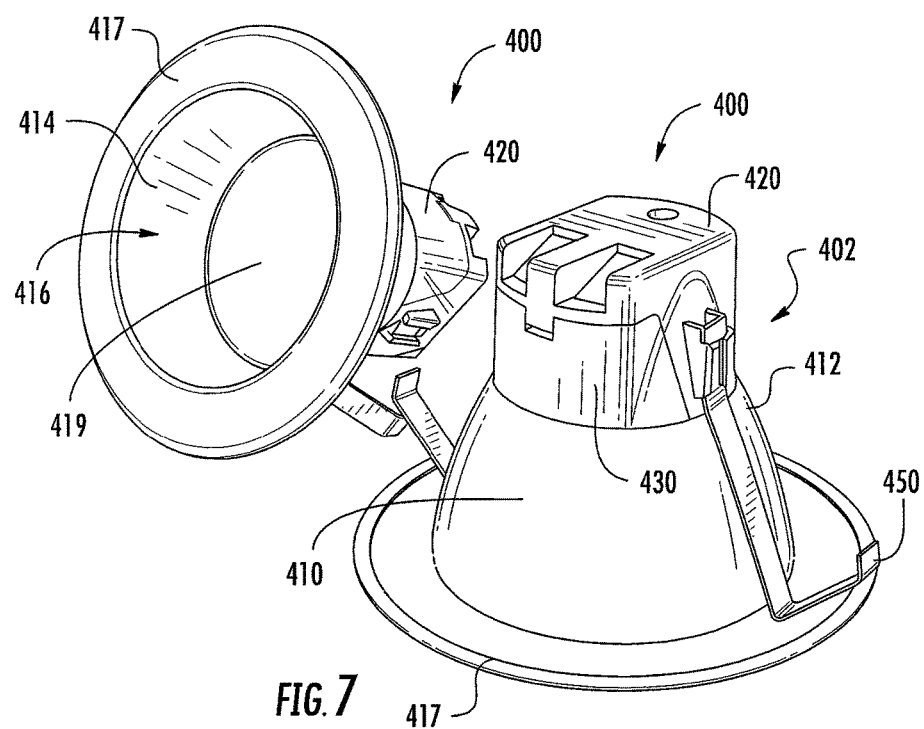
FIG. 7 is a perspective view of two of the solid state downlights according to further embodiments of the present invention in different orientations.
Figure 8:
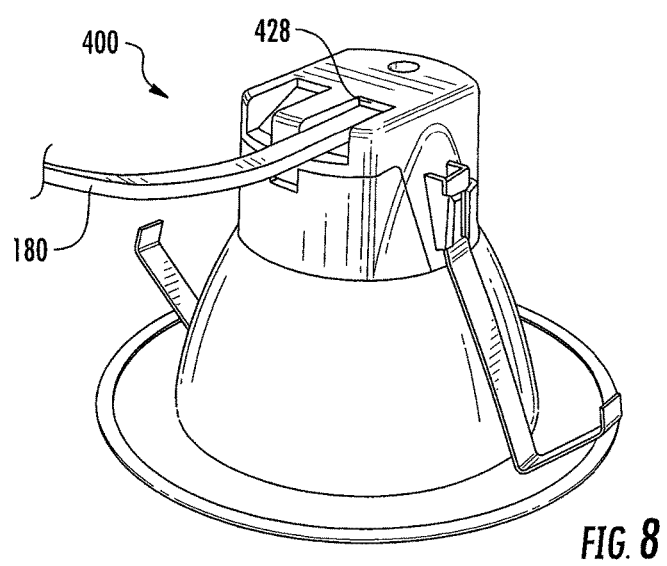
FIG. 8 is a side perspective view of one of the solid state downlights of FIG. 7 with an external electrical wire terminated into a junction box thereof.
Figure 9:
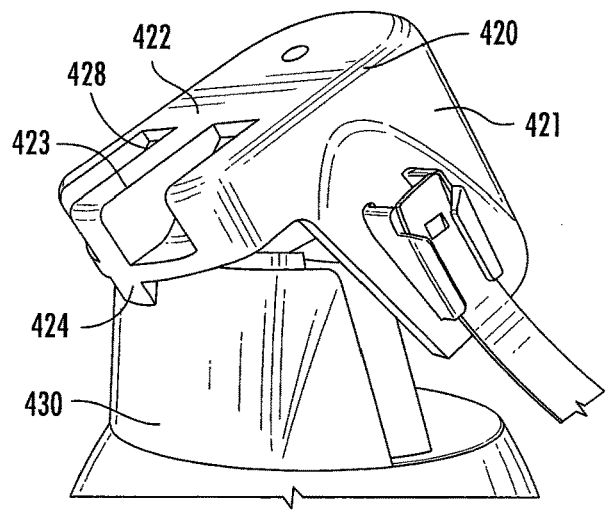
FIG. 9 is an enlarged view of a top portion of one of the solid state downlights of FIG. 7 illustrating how the junction box thereof may be opened.
Figure 10:
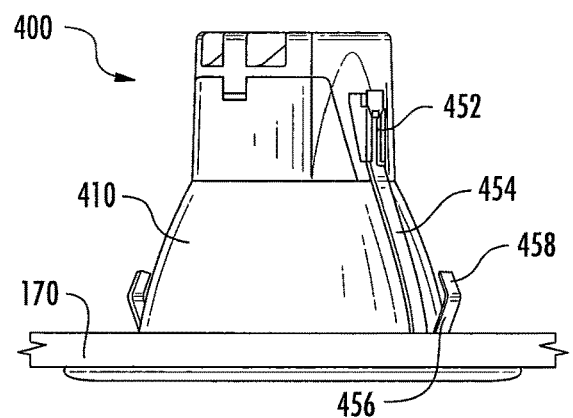
FIG. 10 is a side view of one of the solid state downlights of FIG. 7 mounted in a drywall ceiling.
Figure 11:
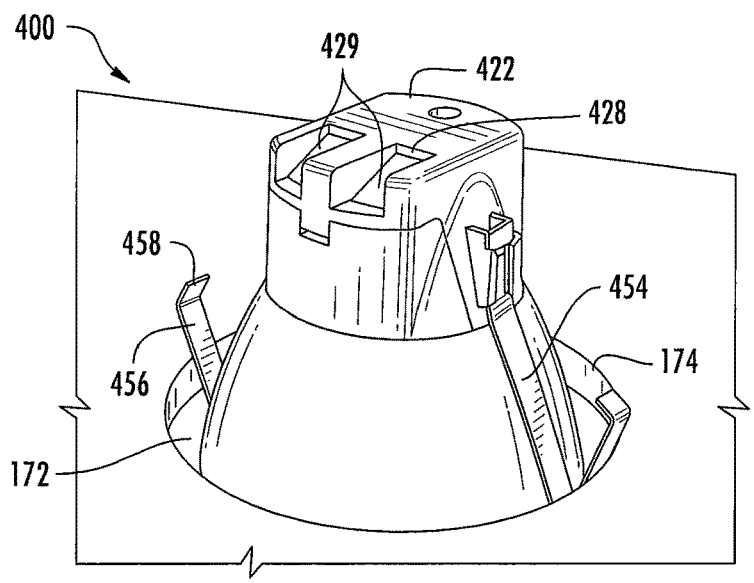
FIG. 11 is a top perspective view of one of the solid state downlights of FIG. 7 mounted in a drywall ceiling
Figure 12:
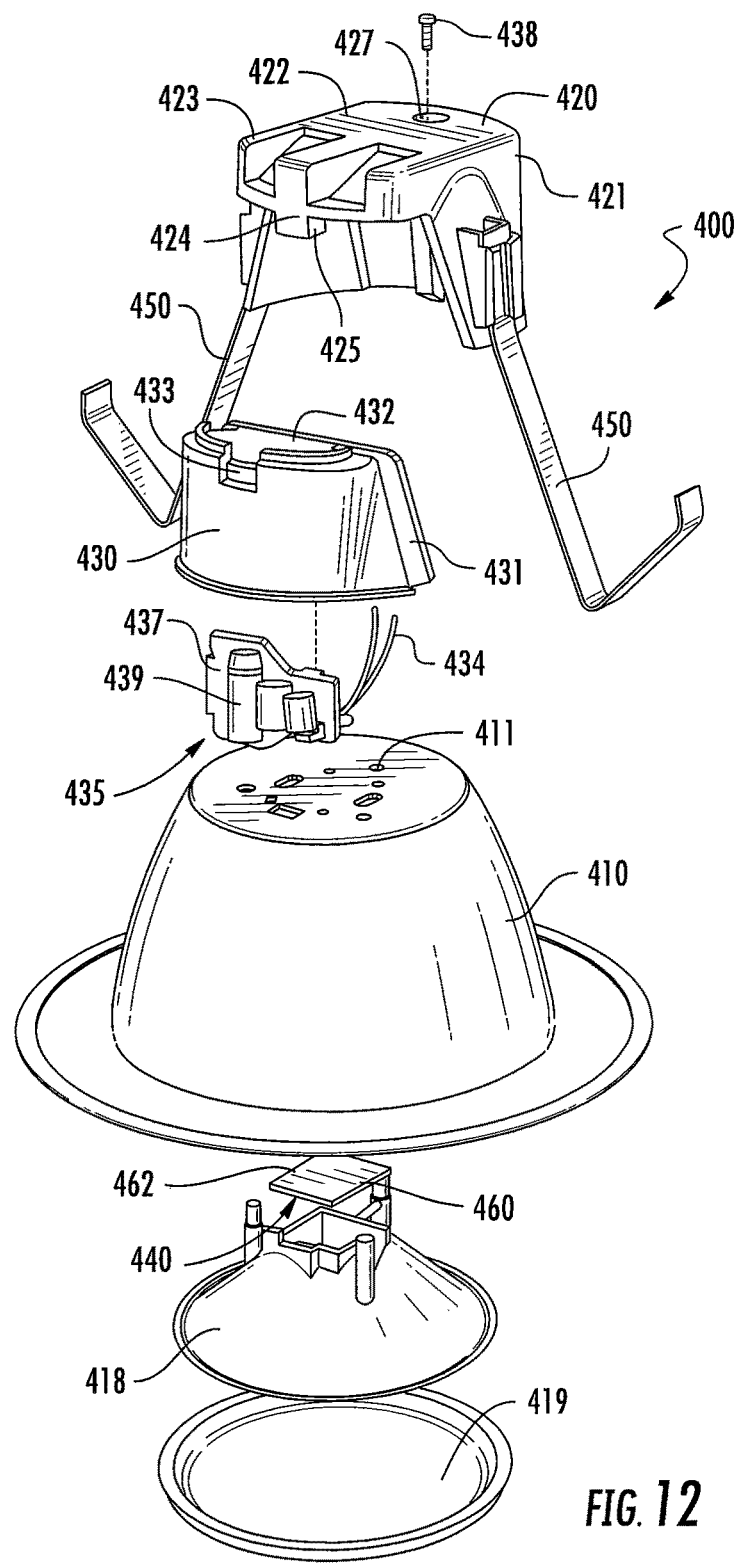
FIG. 12 is an exploded perspective side view of one of the solid state downlights of FIG. 7.
Figure 13:
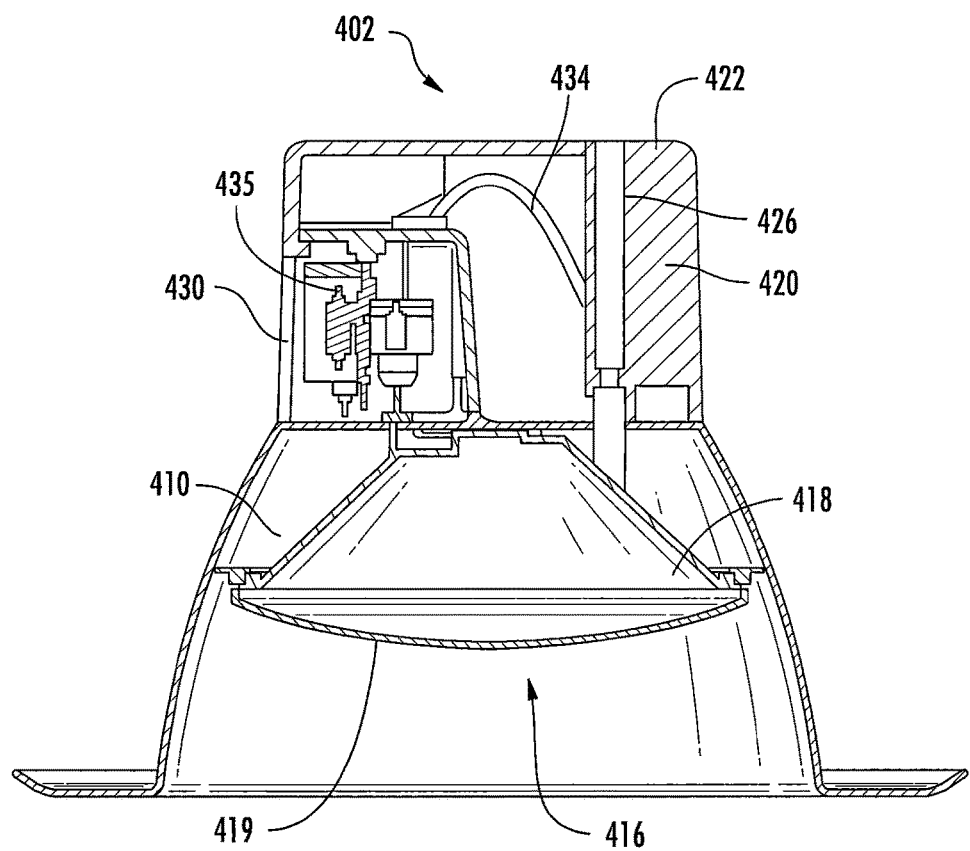
FIG. 13 is a cross-sectional view of one of the solid state downlights of FIG. 7.

FIGS. 7-13 illustrate a solid state downlight 400 according to further embodiments of the present invention. In particular, FIG. 7 is a perspective view of two of the solid state downlights 400 in different orientations. FIG. 8 is a side perspective view of the solid state downlight 400 with an external electrical wire 180 terminated into a junction box 420 thereof. FIG. 9 is an enlarged view of a top portion of the solid state downlight 400 illustrating how the junction box 420 thereof may be detached. FIGS. 10 and 11 are a side view and a top perspective view, respectively, of the solid state downlight 400 mounted in a drywall ceiling 170. FIG. 12 is an exploded perspective side view of the solid state downlight 400. FIG. 13 is a cross-sectional view of the solid state downlight 400

Referring to FIGS. 7-13, the solid state downlight 400 comprises a solid state lighting housing 410 having a base 412 and an open end 414. The solid state downlight 400 may be mounted in an opening 172 in a ceiling 170 with the open end 414 facing downwardly. Solid state light emitting elements such as LEDs 440 may be mounted in the solid state lighting housing 410 to emit light through the open end 414 thereof.

As shown in FIG. 7, the interior surface of the base 412 of the solid state lighting housing 410 is shaped to define an optical chamber 416. The interior surface of the solid state lighting housing 410 may be reflective and may be shaped to redirect light out of the open end 414. A reflector cone 418 (see FIG. 12) may alternatively be provided that fits inside the housing 410. A lens 419 is also provided within the open end 414 of the solid state lighting housing 410 within the optical cavity 416. The lens 419 and reflector cone 418 can be held in place inside the solid state lighting housing 410 via any conventional attachment means.

Referring to FIGS. 7, 12 and 13, the reflector cone 418 includes an opening in a center portion thereof. A circuit element 460 that comprises a circuit board 462 may be aligned with the opening in the reflector cone 418. The LEDs 440 may be mounted on the circuit board 462 (the location of the LEDs 440 is indicated in FIG. 12, but the LEDs are not visible; the LEDs 440 may be mounted on the printed circuit board 462 in the same manner as shown in FIGS. 3-5 with respect to printed circuit board mounted LEDs 140, 240 and 302). The circuit board 460 may be mounted to, for example, the solid state lighting housing 410 or the reflector cone 418 using any conventional attachment means.

The solid state downlight 400 further includes a junction box 420 and a driver housing 430. Herein, the solid state lighting housing 410, the junction box 420, the driver housing 430 and the components included in each of these housings comprise a fixture 402. The fixture 402 along with the mounting structures 450 together comprise the solid state downlight 400.

In the depicted embodiment, the driver housing 430 is attached to the top surface of the solid state lighting housing 410. The driver housing 430 may be permanently or removably attached to the solid state lighting housing 410. The driver housing 430 comprises a cup-like structure that has sidewalls 431 and a top surface 432. An opening 433 is provided in an upper portion of one of the sidewalls 431. A driver circuit 435 is enclosed within the driver housing 430. The driver circuit 435 may include, for example, a printed circuit board 437 having a plurality of electronic components 439 mounted thereon. The electronic components 439 may include, for example, a protective circuit, an EMI filter and rectifier circuit and a voltage conversion circuit such as a boost or buck circuit. The protective circuit may include, for example, a fuse and/or a metal oxide varistor that protect the remainder of the driver circuitry from voltage transients that may occur as a result of lightning strikes or other power surges. The EMI filter and rectifier circuit may take an input AC electrical signal and output a DC electrical signal that is suitable for powering the LEDs 440. The voltage conversion circuit may convert a DC electrical signal having a first voltage level into a DC electrical signal having a second, different voltage level that is more suitable for powering the LEDs 440. The voltage conversion circuit may comprise, for example, a boost circuit, a buck circuit, a flyback circuit or a SEPIC circuit. Driver circuits for solid state light devices are well known and hence further description of the electronic components of the driver circuit 435 will not be discussed herein.

A pair of leads 434 in the form of first and second insulated wire conductors extend from the driver circuit 435 and through an opening (not shown) in the driver housing 430. The electrical leads 434 may comprise, for example, individually insulated copper wires or a pair of copper wires enclosed within a common insulator. The electrical leads 434 extend into an interior of the junction box 420, as will be described in greater detail below.

The junction box 420 is detachably mounted to the solid state lighting housing 410 and the driver housing 430. A pair of mounting structures 450 in the form of spring mounting arms are attached to the junction box 420 and may be used to directly mount the solid state downlight 400 to the ceiling 170. The junction box 420 of the illustrated embodiment may be easily detachable and re-attachable to the base 412 of the solid state lighting housing 410 to facilitate connecting an external electrical wire 180 that runs through the ceiling 170 to the solid state downlight 400 for purposes of providing electrical power to the solid state downlight 400. In other embodiments, the junction box 420 may be permanently attached to the solid state lighting housing and/or the driver housing 430 by a hinge or other mechanism that allows an installer access to the interior of the junction box 420.

The junction box 420 includes at least one sidewall 421 and a top surface 422. Bottom edges of the sidewall 421 rest on the top surface of the solid state lighting housing 410. The top surface 422 includes an extension 423 that covers the top surface 432 of the driver housing 430. The extension 423 includes a downwardly projecting finger 424 that has an inwardly projecting tab 425 (see FIG. 12) on a distal end thereof. The tab 425 may fit within the opening 433 in the sidewall 431 of the driver housing 430. A hollow cylindrical or frusto-conical projection 426 extends downwardly from a hole 427 in the top surface 422 (see FIGS. 12-13). A screw hole with an appropriate lip may be provided in the bottom of the projection 426 that is aligned with a threaded hole 411 in the top surface of the solid state lighting housing 410. After an external electric wire 180 has been terminated into the junction box 420 in a manner that is described herein, the tab 425 of finger 424 may be inserted into the opening 433 in the driver housing 430 and a screw 438 may be inserted into the hole 427 and threaded into the threaded hole 411 in the solid state lighting housing 410 in order to fixedly attach the junction box 420 into place on the solid state lighting housing 410 next to the driver housing 430 in a side-by-side arrangement. Once attached in this manner, the junction box 420 along with the sidewall 431 of the driver housing 430 and the top surface of the solid state lighting housing 410 define an enclosed wire connection space in which an external electrical wire 180 that is routed in the ceiling 170 of the structure may be connected to the electrical leads 434 that extend from the driver circuit 435 into the wire connection space in order to provide electrical power to the solid state downlight 400.

Referring to FIGS. 8-9 and 11, the top surface 422 of junction box 420 includes a pair of openings 428 which are sized to allow external electrical wires 180, such as standard electrical wiring for carrying 110 or 220 volt AC electrical signals in homes and commercial buildings, to be routed into the wire connection space in the interior of the junction box 420. The external electrical wire 180 will typically comprise a pair a copper wires that are enclosed in a pair of channels in an elongated flat insulating jacket that insulates each copper wire from external elements and from the other wire. The first copper wire of the pair may comprise a power supply conductor 182 and the second copper wire may comprise a return conductor 184 that may together provide, for an example, a 110 volt AC power supply signal to the solid state downlight 400. It will be appreciated that the external electrical wire 180 may comprise a single insulated structure that includes both the power supply and return conductors 182, 184 or may comprise two separate insulated wires. Each opening 428 includes an associated resiliently cantilevered cover 429 that is biased to cover its respective opening 428. An end of the external electrical wire 180 is pressed against the cover 429 to resiliently deflect the cover 429 to expose the opening 428. The end portion of the external electrical wire 180 may then be routed into the wire connection space in the interior of the junction box 420 through the opening 428. The cover 429 is resiliently cantilevered and configured to move toward its resting position in which it covers the opening 428, and hence imparts a force on the external electrical wire 180, thereby providing strain relief.

As shown in FIGS. 7-12, the junction box 420 may include two openings 428. The first opening 428 may be used to route a first external electrical wire 180 into the wire connection space for purposes of providing an AC power signal to the solid state downlight 400. A second external electrical wire 180 may be routed into the wire connection space through the second opening 428 and electrically connected in series to the first external electrical wire 180. The opposite end of the second external electrical wire 180 may then be routed to, for example, another solid state downlight 400 to provide electrical power thereto. Thus a series of solid state downlights 400 may be powered using a single external electrical wire 180 that is connected to a power source within the building.

FIGS. 14-17 illustrate how the solid state downlight 400 may be connected to an external electrical wire 180 to provide electrical power thereto and then installed in a ceiling 170 of a building. The external electrical wire 180 may be a standard electrical wire that is connected to a 110 volt AC power source that is routed through the ceiling 170 of the building.

Figure 14:
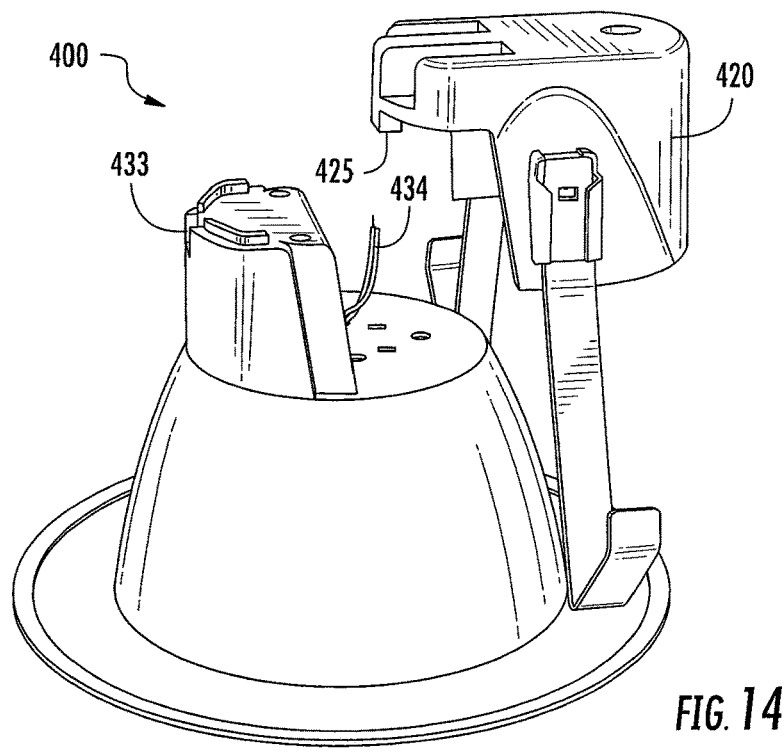
FIGS. 14-17 are perspective views illustrating the installation of the solid state downlight of FIGS. 7-13.
Figure 15:
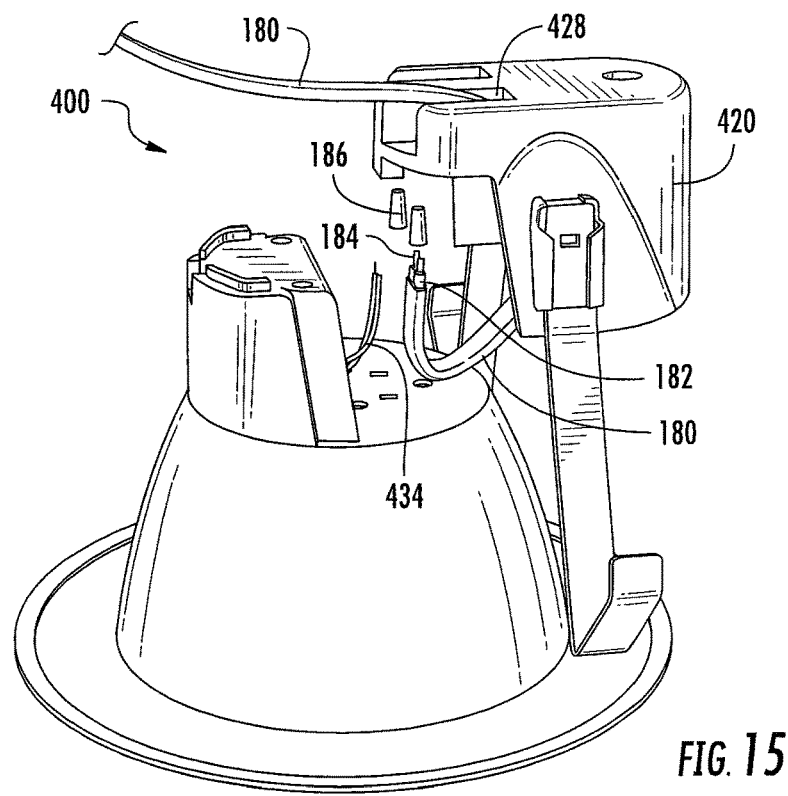
Figure 16:
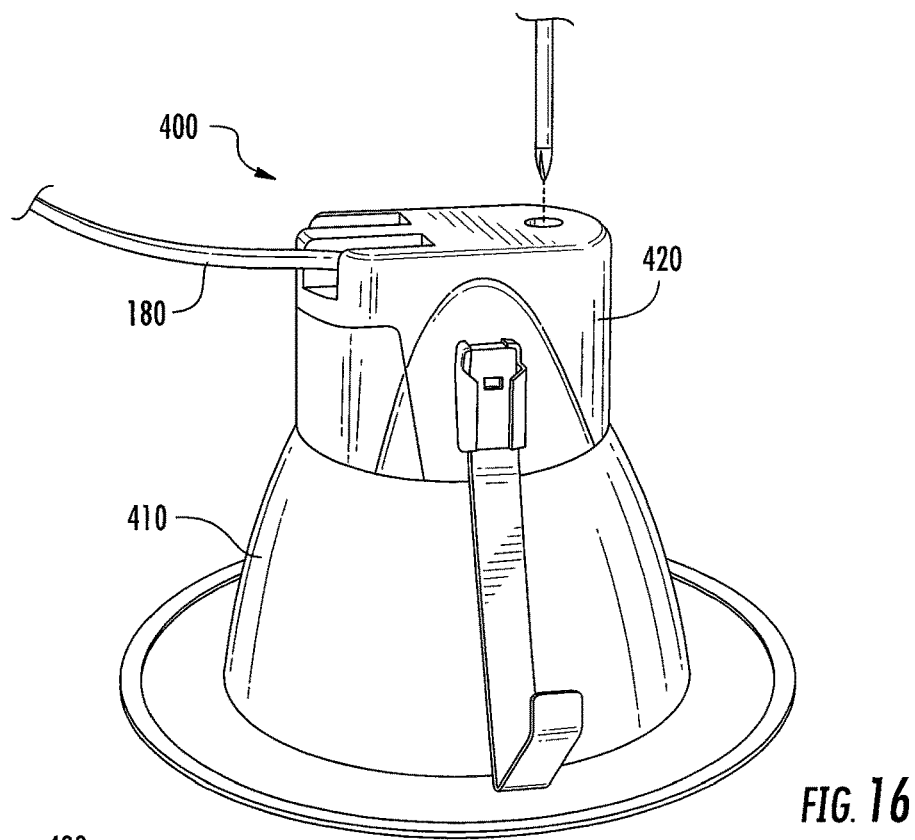
Figure 17:
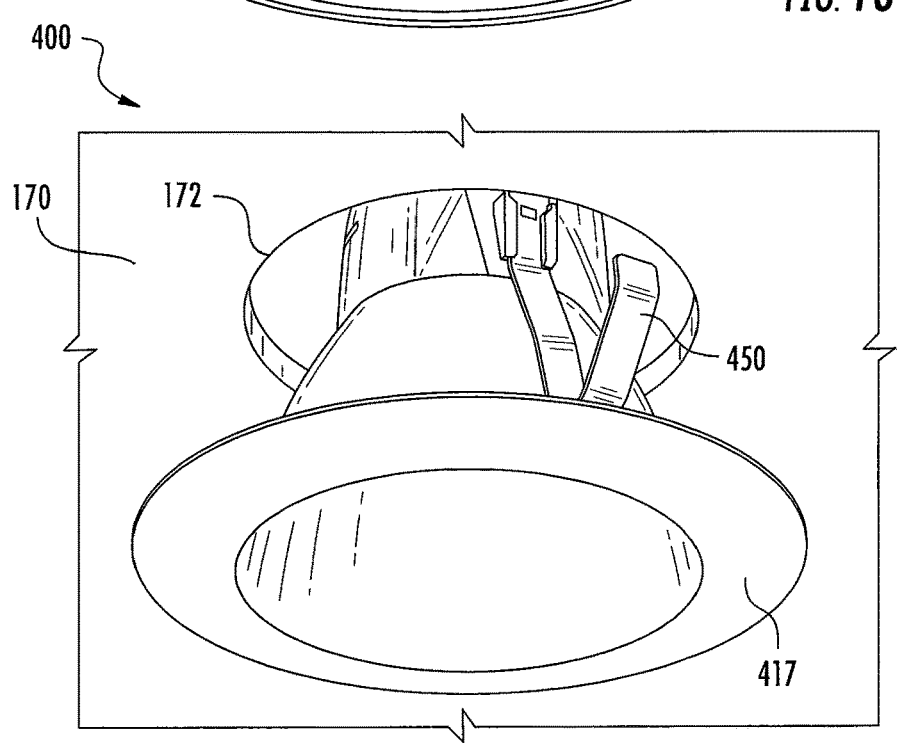

As shown in FIG. 14, to connect the external electrical wire 180 to the fixture 402, the junction box 420 may first be removed from the remainder of the fixture 402. This may be accomplished by unthreading the screw 438 (see FIG. 12) and shifting the junction box 420 so that the tab 425 is moved out of the opening 433 in the driver housing 430. Referring to FIG. 15, the external electrical wire 180 may next be routed through one of the openings 428 in the manner described above. The insulation may be stripped in advance from the last inch or two of the external electrical wire 180 to expose end portions of the power supply conductor 182 and the return conductor 184. Wire nuts 186 or other wire attachment mechanisms may then be used to connect the power supply 182 and return 184 conductors of the external electrical wire 180 to the first and second electrical leads 434 that connect to the driver circuit 435. Referring to FIG. 16, the junction box 420 may then be reinstalled on the solid state lighting housing 410 and locked in place by threading the screw 438 into the threaded hole 411 in the solid state lighting housing 410. Finally, referring to FIG. 17, the solid state downlight 400 may then be inserted through an opening 172 in the ceiling 170 to complete the installation thereof.

FIGS. 10 and 11 illustrate the solid state downlight 400 after it has been installed in the opening 172 in the ceiling 170. As shown best in FIGS. 10 and 17, the lip 417 of the solid state lighting housing 410 has a diameter that exceeds a diameter of the opening 172 in the ceiling 170. Accordingly, the lip 417 prevents the solid state downlight 400 from passing all the way through the opening 172. Each spring mounting arm 450 includes a base 452, an elongated extension 454, a spring 456 and an insertion tab 458. As shown in FIGS. 10-11, the base 452 of each spring mounting arm 450 is fixedly attached to the fixture 402. In the depicted embodiment, the base 452 is attached to the sidewall 421 of the junction box 420, but it will be appreciated that it may alternatively be attached to other elements of the fixture 402 such as the solid state lighting housing 410 or the driver housing 430. The elongated extension 454 extends from the base 452 and may generally conform to the exterior of the solid state lighting housing 410. The spring 456 is formed by bending an end portion of the elongated extension 454 at an angle that exceeds 90 degrees (e.g., 120 to 170 degrees). The insertion tab 458 is formed by bending an end portion of the spring 456 by an acute angle.

As can be seen in FIGS. 10 and 11, when the fixture 402 is inserted through the opening 172 in the ceiling 170, the insertion tabs 458 engage sidewalls 174 of the opening 172 and the insertion tabs 458 and springs 456 are pushed inwardly toward the fixture 402, thereby allowing the fixture 402 to be inserted through the opening 172 until the lip 417 comes into contact with the ceiling 170. As the fixture 402 moves farther into the opening 172, the insertion tabs 458 clear the sidewalls 174 and expand outwardly, and the springs 456 engage the sidewalls 174. The force exerted by the springs 456 holds the fixture 402 in place within the opening 172.

The spring mounting arms 450 may be designed to mount the fixture 402 directly to ceilings 170 having a variety of different thicknesses. Drywall comes in a variety of different thicknesses, and a wide variety of ceiling tiles are commercially available that again may have different thicknesses. The spring mounting arms 450 may be designed, for example, to provide sufficient spring force to hold the fixture 402 firmly in place in openings 172 in ceilings 170 having thicknesses in the range of 0.375 inches to 0.675 inches in some embodiments.

Because the external electrical wire 180 connects to the electrical leads 434 within the wire connection space in the junction box 420, the solid state downlight 400 may comply with various regulations for electrical wiring and/or fire safety. In particular, the junction box 420 may be formed of, for example, a fire resistant, insulative material and may be sized to comply with electrical wiring safety regulations. As such, the solid state downlight 400 need not be mounted in a sheet metal lighting can in order to comply with such regulations. Additionally, as the spring mounting arms 450 are configured to mount the fixture 402 directly to the ceiling 170, a sheet metal lighting can is also not necessary for mounting the solid state downlight 400. Thus, the solid state downlight 400 may be lighter, less costly, smaller and easier to install as compared to conventional downlights. In addition, the solid state downlights 400 may not require any external strain relief for the external electrical wire(s) 180, and hence installers may forego any need for applying other strain relief methods such as, for example, tying a knot in the external electrical wire 180 adjacent an opening into the downlight. Moreover, the solid state downlights 400 may include separate housings for the lighting components, the driver circuit and the connection to an external wire.

Figure 18:
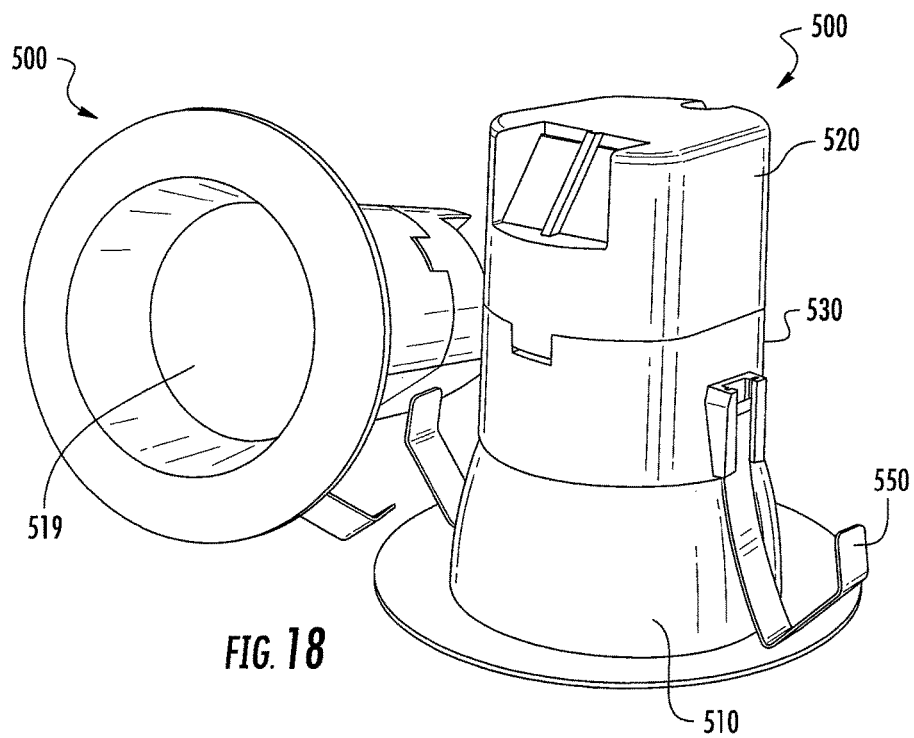
FIG. 18 is a perspective view of two solid state downlights according to still further embodiments of the present invention.
Figure 19:
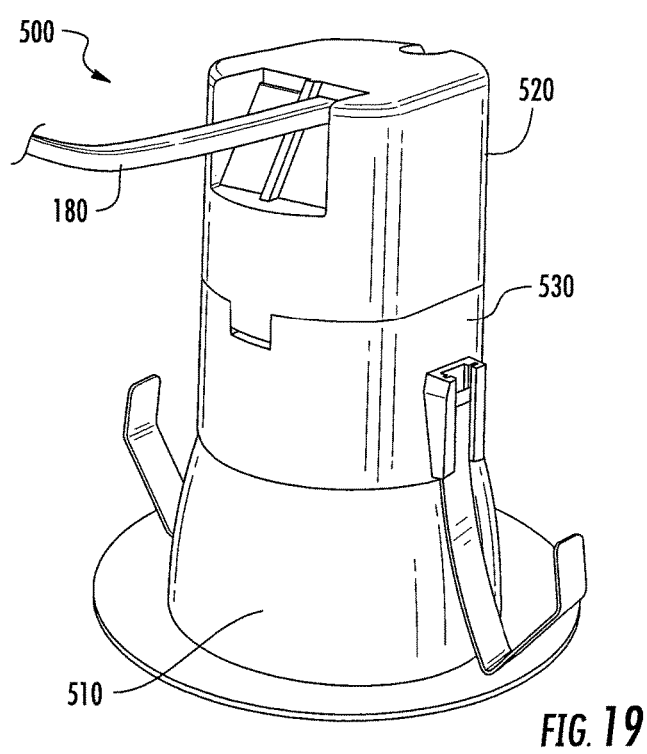
FIG. 19 is a side perspective view of one of the solid state downlights of FIG. 18 with an external electrical wire terminated into a junction box thereof.
Figure 20:
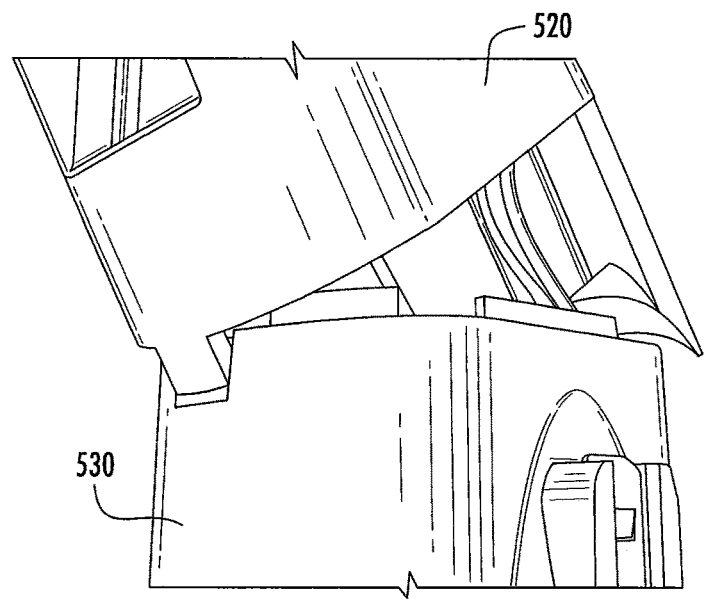
FIG. 20 is an enlarged view of a top portion of one of the solid state downlights of FIG. 18 illustrating how the junction box thereof may be opened.
Figure 21:
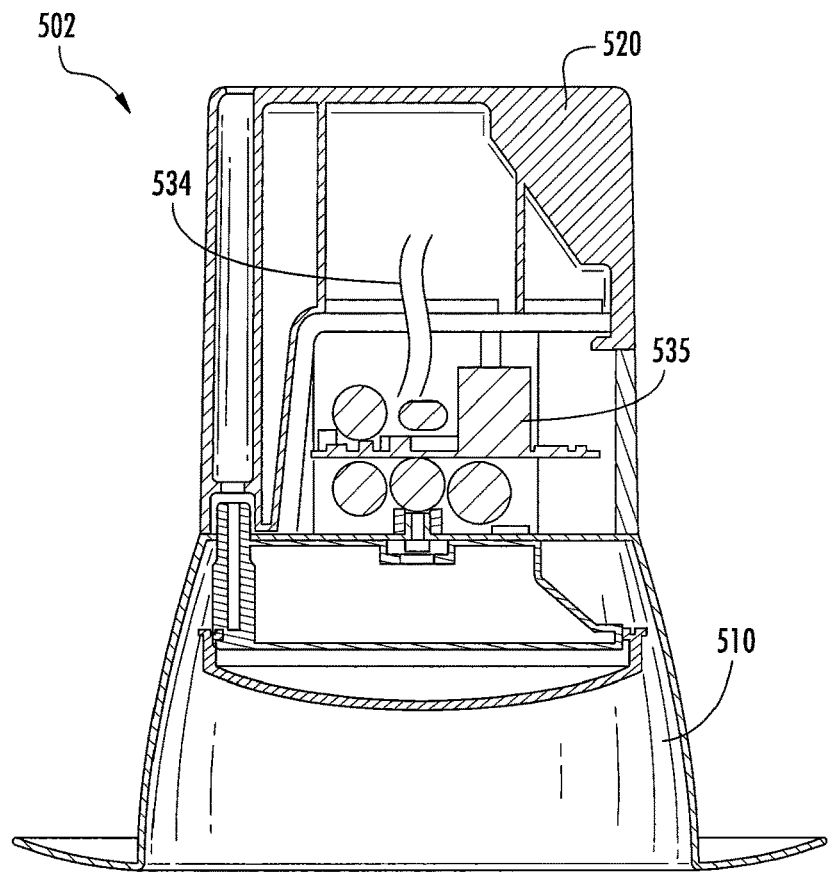
FIG. 21 is a cross-sectional view of one of the solid state downlights of FIG. 18.

FIGS. 18-21 illustrate a solid state downlight 500 according to further embodiments of the present invention. In particular, FIG. 18 is a perspective view of two of the solid state downlights 500 in different orientations. FIG. 19 is a side perspective view of the solid state downlight 500 with an external electrical wire 180 terminated into a junction box 520 thereof. FIG. 20 is an enlarged view of a top portion of the solid state downlight 500 illustrating how the junction box 520 may be opened. FIG. 21 is a cross-sectional view of the solid state downlight 500.

As shown in FIGS. 18-21, the solid state downlight 500 is very similar to the solid state downlight 400 that is discussed in detail above. The solid state downlight 500 includes a fixture 502 that comprises a solid state lighting housing 510, a junction box 520 and a driver housing 530, and various circuitry, wiring and other elements that are included in these housings and that are described above with reference to the solid state downlight 400. The solid state downlight 500 further includes a mounting structure 550 in the form of two spring mounting arms.

In some embodiments, the solid state downlight 400 described above may include a 6 inch lens and be designed as a replacement or alternative for conventional 6 inch incandescent downlights. The solid state downlight 500 may be designed to have a smaller lens such as, for example, a 4 inch lens, and hence may have a smaller solid state lighting housing 510 as compared to the solid state lighting housing 410 of downlight 400. Because of the smaller solid state lighting housing 510, in the solid state downlight 500, the driver housing 530 may cover the entire top surface of the solid state lighting housing 510. The junction box 520 is stacked on top of and covers the top surface of the driver housing 530. Two electrical leads 534 extend from a driver circuit 535 that is located in the driver housing 530 into the junction box 520 (see FIG. 21). Other than the above-discussed differences, the solid state downlight 500 may have the same general structure and operation as the solid state downlight 400, and hence further description thereof will be omitted.

Figure 22:
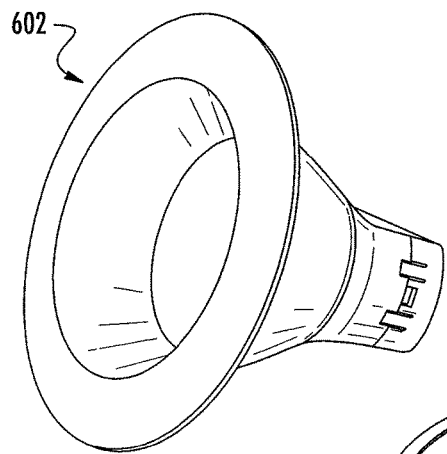
FIG. 22 is a side perspective view of a solid state downlight according to yet further embodiments of the present invention.
Figure 23:
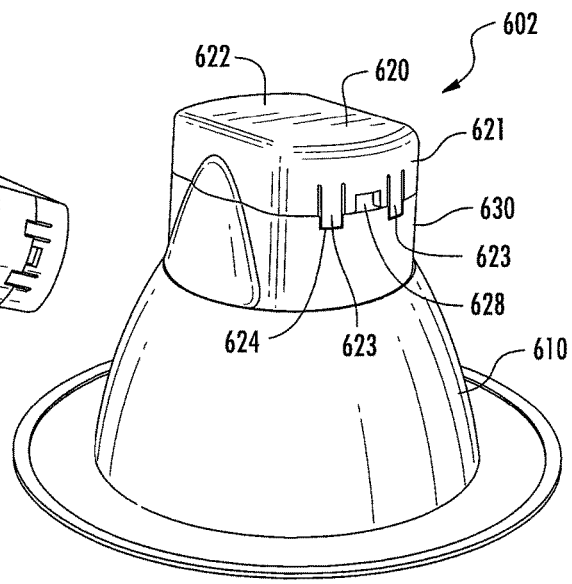
FIG. 23 is a bottom perspective view of the solid state downlight of FIG. 22.
Figure 24:
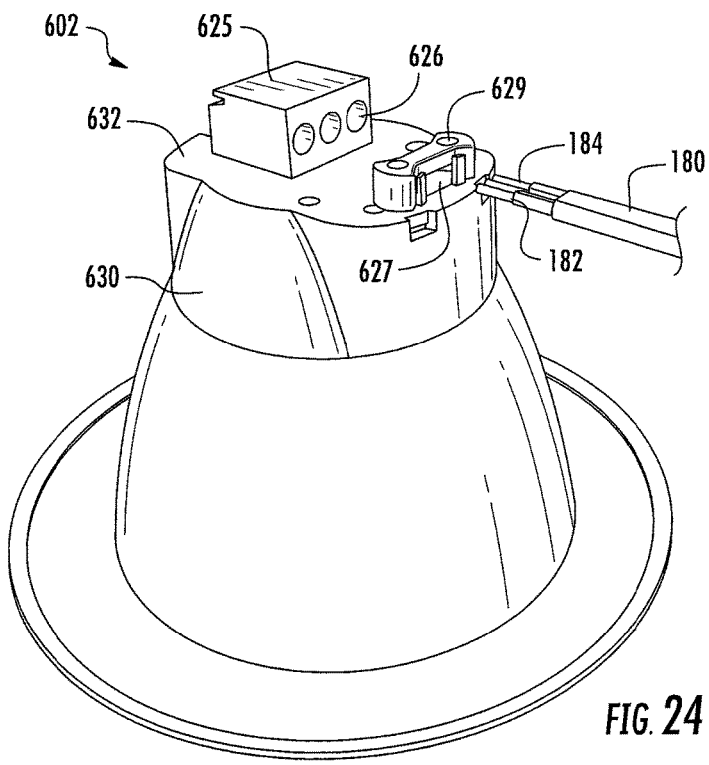
FIG. 24 is a top perspective view of the solid state downlight of FIG. 22 with the junction box thereof removed.

FIGS. 22-24 illustrate a solid state downlight fixture 602 according to still further embodiments of the present invention. In particular, FIGS. 22 and 23 are a side perspective view and a bottom perspective view, respectively, of the solid state downlight 600. FIG. 24 is an enlarged view of a top portion of the fixture 602 with an external electrical wire 180 terminated into a junction box thereof. A mounting structure (not shown) such as, for example, the pair of spring mounting arms 450 described above may be attached to the fixture 602 to provide a solid state downlight 600.

The fixture 602 is similar to the fixture 502 discussed above with respect to FIGS. 7-17, except that the fixture 602 has an alternate design for the junction box 620 thereof that includes a bayonet wire clamp wire termination. In particular, the fixture 602 has a solid state lighting housing 610, a driver housing 630 and a junction box 620. The solid state lighting housing 610 may be identical to the solid state lighting housing 510 in terms of size, shape and the components included therein, and hence further description thereof will be omitted. The driver housing 630 may be identical to the driver housing 530 that is discussed above in terms of size, shape and the components included therein, and hence further description thereof will be omitted.

As shown in FIGS. 22 and 23, the junction box 620 includes sidewalls 621 and a top surface 622. A pair of downwardly extending cantilevered fingers 623 that have inwardly extending tabs (not visible in the figures) extend from one of the sidewalls 621. A third downwardly extending finger with an inwardly extending tab (not shown) may be provided on an opposite sidewall 621. As can be seen in FIG. 23, the driver housing 630 has a pair of openings that receive the inwardly extending tabs of fingers 623, and a similar opening is provided on the opposite side of driver housing 630 for receiving the inwardly extending tab of the third finger. The junction box 620 may be fixedly attached to the driver housing 630 by inserting the inwardly extending tab of the third finger into its mating opening in the driver housing 630 and then rotating the other side of the junction box 620 downwardly so that the inwardly extending tabs on the pair of fingers 623 move towards their respective openings in the driver housing 630. As the inwardly extending tabs on the cantilevered fingers 623 come into contact with the driver housing 630, the tabs and the cantilevered fingers 623 that they extend from are forced outwardly. As soon as the tabs reach the openings in the driver housing 630, they snap inwardly, locking the junction box 620 in place on top of the driver housing 630. A user can remove the junction box 620 from the driver housing 630 by, for example, inserting a screwdriver into the small gap 624 that is provided between the bottom of each finger 623 and the driver housing 630 and using the screwdriver to push each finger 623 outwardly while at the same time pushing upwardly on the junction box 620.

An external electrical wire 180 may be routed into the junction box 620 through an opening 628 in a sidewall 621 of the junction box 620. As shown in FIG. 24, a bayonet wire clamp 625 is mounted on the top surface 632 of the driver housing 630 opposite the opening 628. The bayonet wire clamp 625 includes at least two wire openings 626 that are configured to receive the respective power supply conductor 182 and return conductor 184 of the external electrical wire 180. The bayonet wire clamp 625 may be of conventional design and may be electrically connected to first and second electrical leads (not shown) from the driver circuit 630 which may, for example, be attached to a bottom surface of the bayonet wire clamp 625 by conventional wire attachment screws (not shown). The bayonet wire clamp 625 may electrically connect the power supply conductor 182 and return conductor 184 of the external electrical wire 180 to the respective electrical leads from the driver circuit 630. The bayonet wire clamp 625 may simplify the process for connecting the external electrical wire 180 to the solid state downlight 600, and may also provide a measure of strain relief. A separate strain relief member 629 may also be mounted on the top surface 632 of the driver housing 630 to define an opening 627 that is sized to have a height that is slightly smaller than the thickness of the insulation on standard AC electrical wiring. The external electrical wire 180 may be routed through the opening 627 which compresses the insulation of the external electrical wire 180 to provide additional strain relief.

Figure 25:
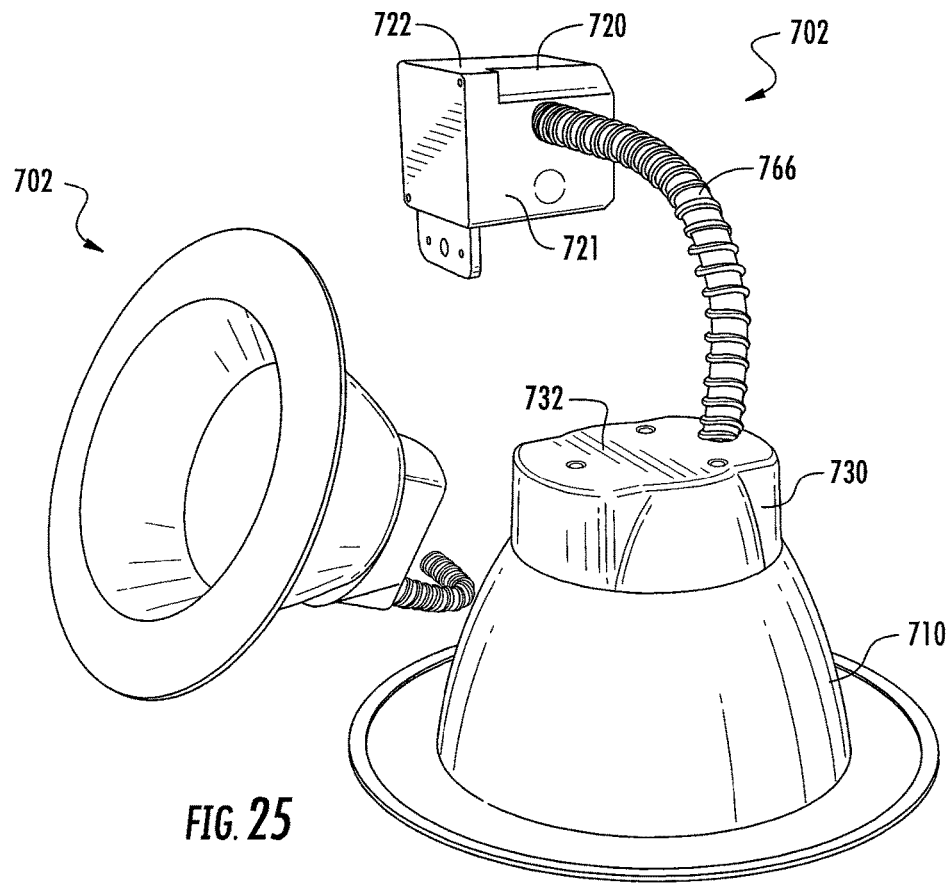
FIG. 25 is a perspective view of two solid state downlights according to still further embodiments of the present invention.
Figure 26:
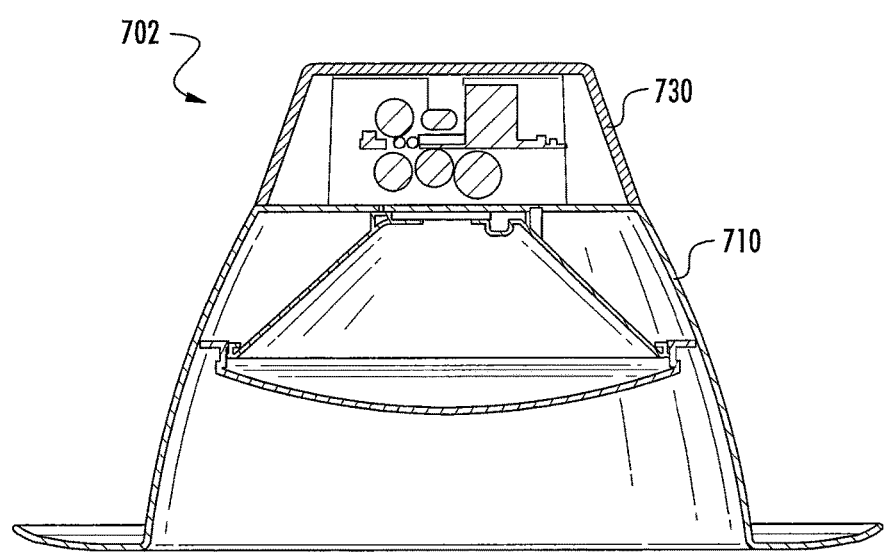
FIG. 26 is a cross-sectional view of one of the solid state downlights of FIG. 26.

FIGS. 25 and 26 illustrate a fixture 702 according to still further embodiments of the present invention. In particular, FIG. 25 is a perspective view of two of the fixtures 702 in different orientations, and FIG. 26 is a cross-sectional view of one of the fixtures 702.

As shown in FIGS. 25 and 26, the fixture 702 comprises a solid state lighting housing 710, a junction box 720 and a driver housing 730. The solid state lighting housing 710 may be identical to the solid state lighting housings 410, 610 of fixtures 402, 602 in terms of size, shape and the components included therein, and hence further description thereof will be omitted. The driver housing 730 may be essentially identical to the driver housing 630 of fixture 602 that is discussed above in terms of size, shape and the components included therein except for a slight variation in the shapes of the two housings, and hence further description thereof will be omitted.

The primary difference between fixture 702 and the fixtures 402 and 602 are that in the fixture 702 is that the junction box 720 is mounted to the driver housing 730 via a flexible wire conduit 766. A first end of the wire conduit 766 passes through an opening in a top surface 732 of the driver housing 730 and may be held in place inside the driver housing 730 by any conventional attachment mechanism. A second end of the wire conduit 766 passes through an opening in a sidewall 721 of the junction box 720 and may be held in place inside the junction box 720 by any conventional attachment mechanism. The wire conduit 766 may comprise, for example, a flexible plastic or metal corrugated tube. Two electrical leads (not shown) that are attached to a driver circuit (not shown) that is located in the driver housing 730 may extend through the wire conduit 766 into the junction box 720. The electrical leads may be connected to respective power supply 182 and return 184 conductors of an external electrical wire 180 (not shown) within the junction box 720. Wire screws, a bayonet wire clamp or the like may be used to make this connection. The junction box 720 has sidewalls 721, a top surface 722 and a removable cover (not shown).

Figure 27:
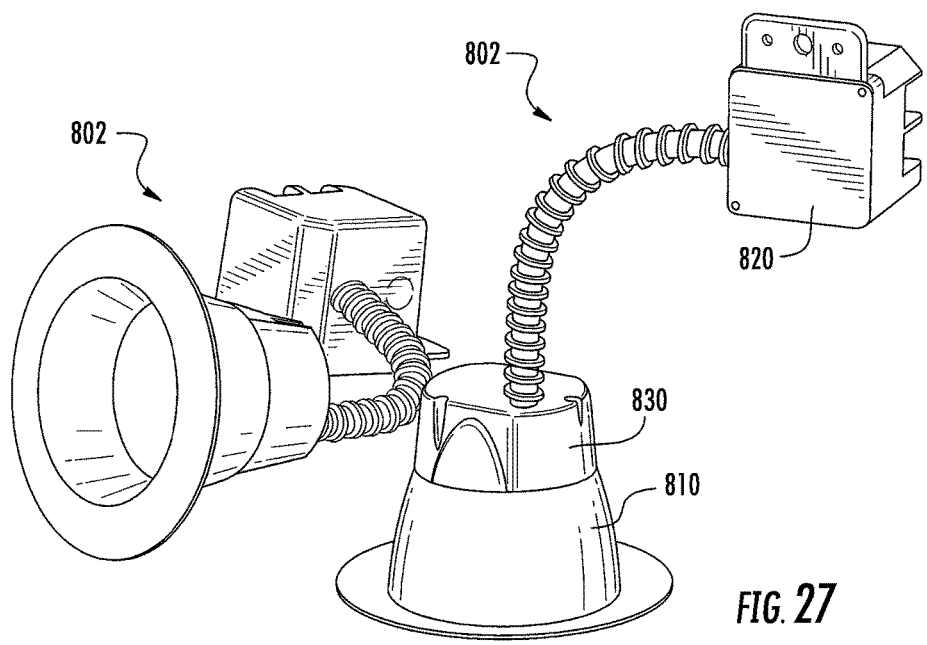
FIG. 27 is a perspective view of two solid state downlights according to additional embodiments of the present invention.
Figure 28:
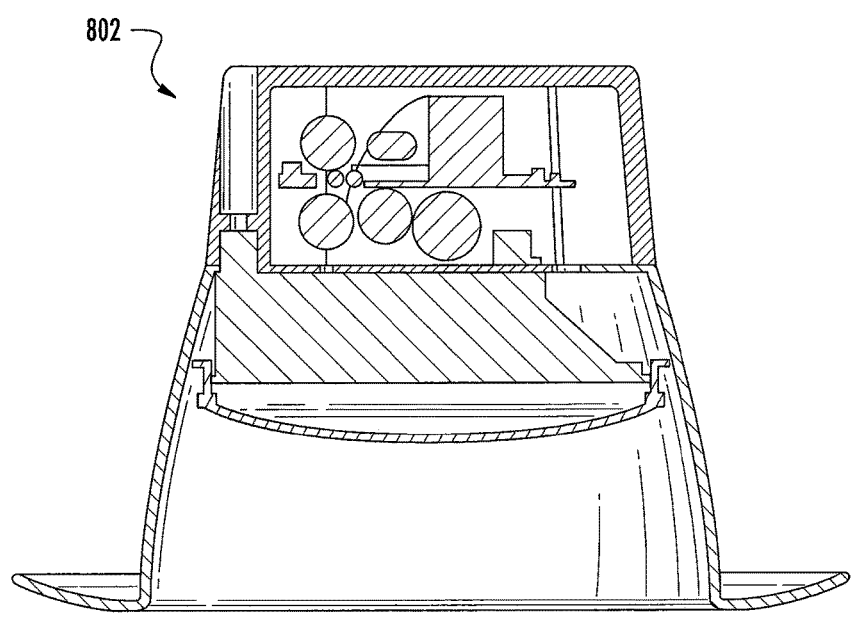
FIG. 28 is a cross-sectional view of one of the solid state downlights of FIG. 27.

A mounting structure (not shown) may be attached to the fixture 702 to provide a solid state downlight 700. The mounting structure may be used to mount the fixture 702 within an opening 172 in a ceiling 170. In some embodiments, the mounting structure may comprise a pair of spring mounting arms similar to the spring mounting arms 450 shown in FIGS. 7-17. In the embodiment of FIGS. 25-26, the base of each mounting arm 450 would be mounted to respective sidewalls 731 of the driver housing 730. Alternatively, the fixture 702 may be mounted using the mounting ring and spring clip mounting structure described below with reference to FIGS. 29-35. Any other appropriate mounting structure may be used to mount the fixture 702 directly to the ceiling 170 without the need for any sheet metal lighting can. As other than the above-discussed differences, the fixture 702 may have the same general structure and operation as the previously described fixtures, further description thereof will be omitted FIGS. 27 and 28 illustrate a fixture 802 according to still further embodiments of the present invention that is a slightly modified version of the fixture 702. FIG. 27 is a perspective view of two of the fixtures 802, and FIG. 28 is a cross-sectional view of one of the fixtures 802. The above-described spring mounting arms 450 or some other mounting structure may be attached to the fixture 802 to provide a solid state downlight 800.

The fixture 802 is almost identical to the fixture 702 that is described above, except that the fixture 702 includes, for example, a 6 inch lens while the fixture 802 includes, for example, a 4 inch lens, and hence has a smaller solid state lighting housing 810 and driver housing 830. The junction box 820 may be identical to the junction box 720. Other than the above-described difference, the fixture 802 may have the same structure and operation as the fixture 702 and hence further description thereof will be omitted.

Figure 29:
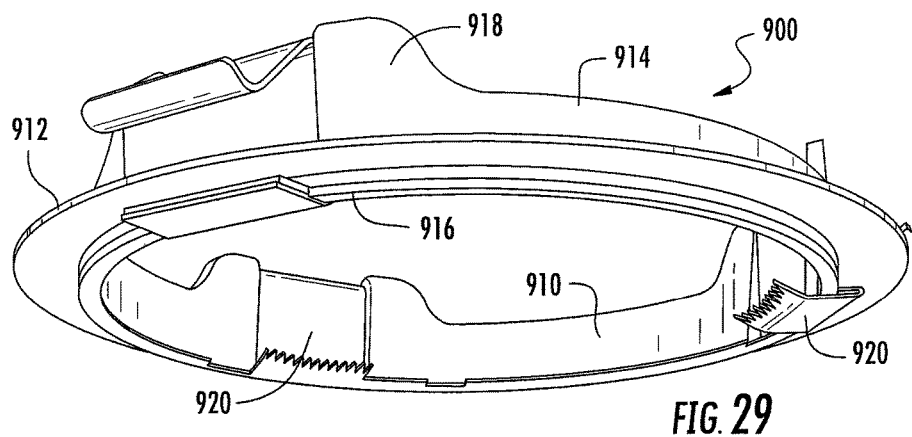
FIG. 29 is a perspective view of a ring mounting structure that may be used to mount solid state downlights according to embodiments of the present invention in an opening in a ceiling.
Figure 30:
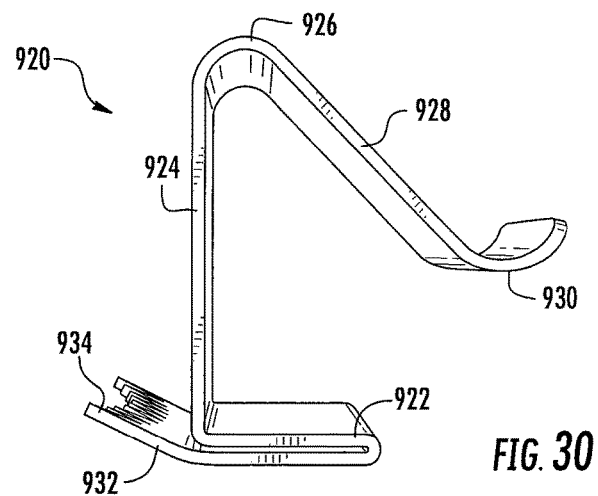
FIGS. 30-31 are perspective views of one of the spring clips of the ring mounting structure of FIG. 29.
Figure 31:
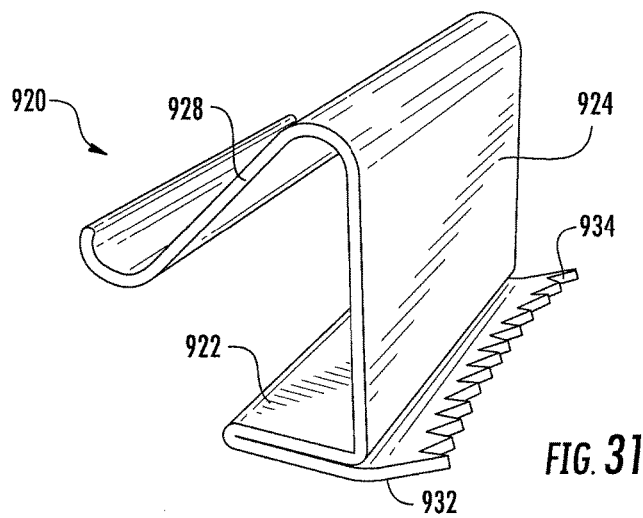

FIGS. 29-31 illustrate a ring mounting structure 900 that may be used to mount solid state downlight fixtures according to embodiments of the present invention in an opening 172 in a ceiling 170. In particular, FIG. 29 is a perspective view of a mounting ring 910 and spring clips 920 of the ring mounting structure 900, while FIGS. 30-31 are perspective views of one of the spring clips 920. As shown in FIG. 29, the mounting ring 910 comprises a circular ring that has a main body 914 that extends generally vertically and a lip 912 that extends laterally outwardly from a lower portion of the main body 914. A flange portion 916 of the main body 914 may extend below the lip 912. The mounting ring 910 may be formed of any suitable material such as plastic.

The main body 914 includes three clip mounts 918. Each clip mount 918 comprises a region of the main body 914 that extends farther upwardly. A central top portion of each clip mount 918 may be recessed to receive a spring clip 920. The flange portion 916 of the main body 914 may also be recessed or removed altogether in the vicinity of the clip mounts 918. As shown in FIG. 29, a spring clip 920 may be mounted in each of the clip mounts 918.

Referring to FIGS. 30 and 31, each spring clip 920 may be formed of a unitary piece of metal. Each spring clip 920 includes a base 922, a vertical extension 924, a curved section 926, a slanted section 928 and a tab 930. The vertical extension 924, the curved section 926, and the slanted section 928 may form a spring. The tab 930 may engage the top side of a ceiling 170 when the ring mounting structure 900 is installed in an opening 172 in a ceiling 170 such that the ceiling is captured between the tabs 930 of each spring clip 920 and the lip 912 of the mounting ring 910. An inwardly extending section 932 extends from the base 922 of the spring clip 920 and terminates in an arcuate section that conforms to the solid state lighting housing of a solid state downlight fixture that is to be mounted using the mounting ring 910. The inwardly extending section 932 terminates in a plurality of teeth 934 that may grip the solid state lighting housing.

Figure 32:
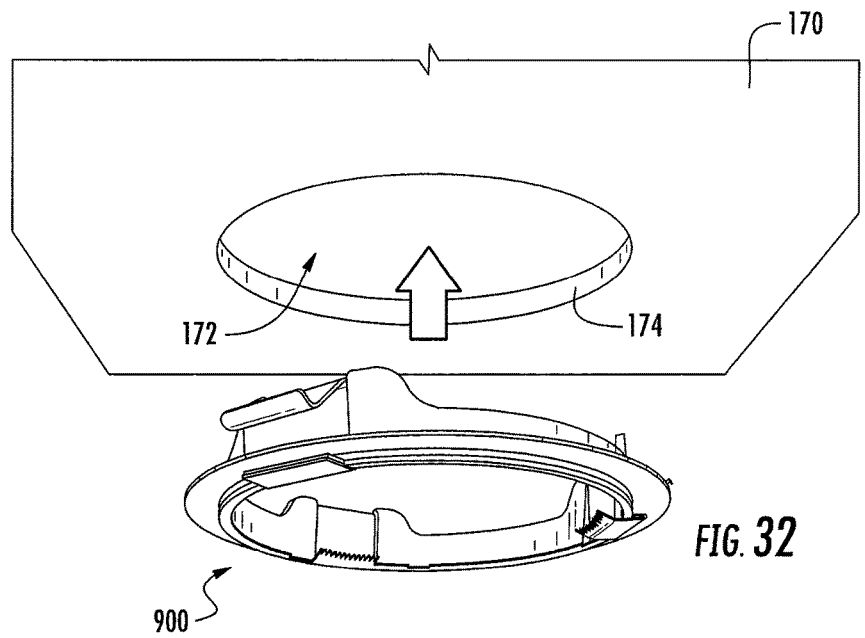
FIGS. 32-35 are perspective views illustrating the installation of a solid state downlight according to embodiments of the present invention into an opening in a ceiling using the ring mounting structure of FIG. 32.
Figure 33:
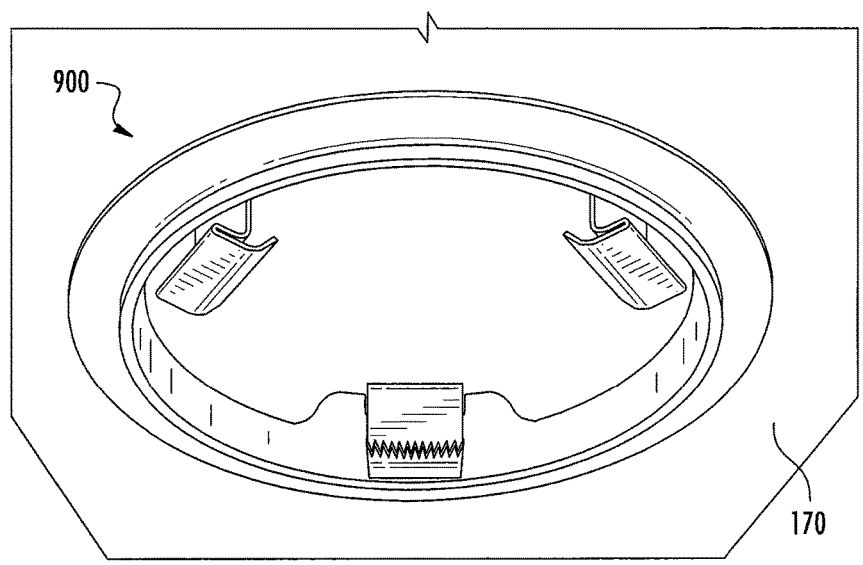

FIGS. 32-35 are perspective views illustrating the installation of a solid state downlight fixture according to embodiments of the present invention into an opening in a ceiling using the mounting ring and spring clips of FIG. 32.

Figure 34:
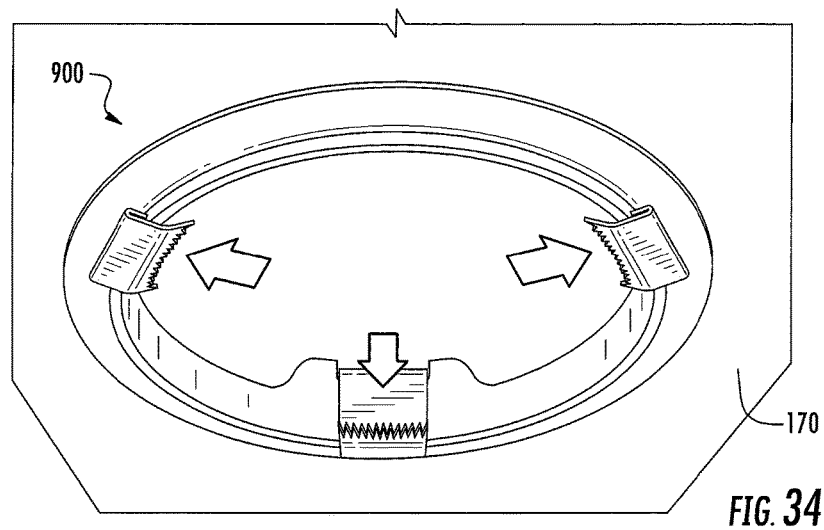
Figure 35:
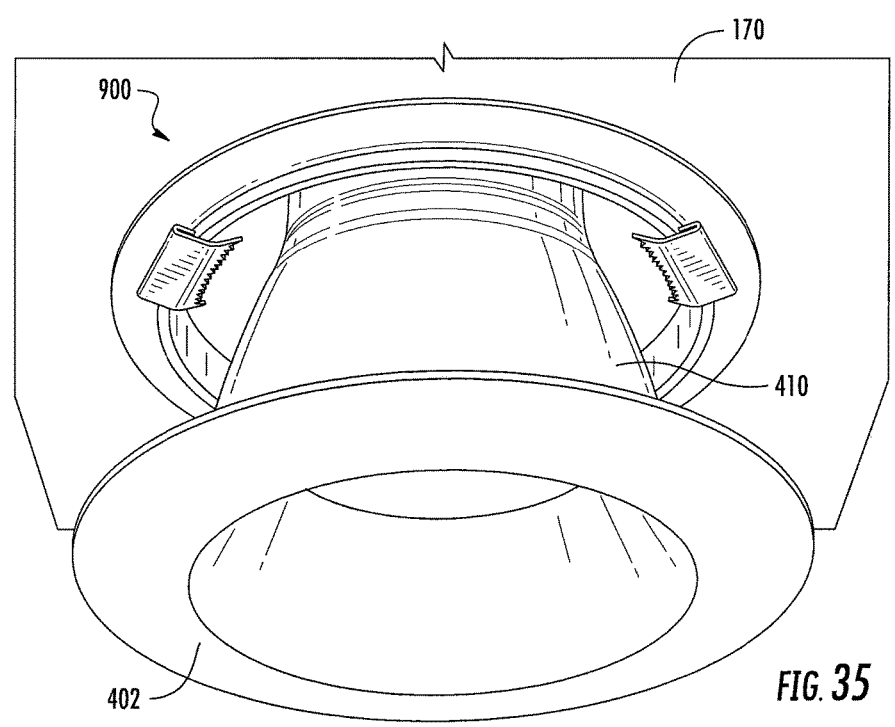

As shown in FIG. 32, the ring mounting structure 900 is inserted upwardly into a circular opening 172 in a ceiling 170. Because the lip 912 has a diameter that is greater than the diameter of the circular opening 172, only the upper portion of the ring mounting structure 900 passes into the opening 172. As shown best in FIG. 33, during this ring mounting structure 900 insertion step, the curved section 926 of each spring clip is mounted into place within its corresponding clip mount 918, but the base 922 of each spring clip 920 is not yet snapped into place within the respective clip mounts 918. Referring to FIG. 34, next, the base 922 of each spring clip 920 may be pushed outwardly so that each spring clip 920 snaps into place within its clip mount 918. Once this has been accomplished, the ceiling 170 is captured between the lip 912 and the bases 922 of the spring clips on its lower side and the tabs 930 of the spring clips 920 on its upper side, and thus the ring mounting structure 900 is fixedly attached to the ceiling 170. As shown in FIG. 35, a solid state downlight fixture such as fixture 402 may then be inserted into the ring mounting structure 900. The teeth 934 on the spring clips 920 engage the solid state lighting housing 410 to hold the fixture 402 in place in the opening 172 in the ceiling 170.

Pursuant to embodiments of the present invention, "canless" solid state downlights are provided that may be directly mounted to the ceiling without the need for the sheet metal lighting cans that are traditionally used with respect to incandescent downlights and conventional solid state downlights. This can significantly reduce the material and installation costs associated with the downlight.

Many different embodiments have been disclosed herein, in connection with the above description and the drawings. It will be understood that it would be unduly repetitious and obfuscating to literally describe and illustrate every combination and subcombination of these embodiments. Accordingly, the present specification, including the drawings, shall be construed to constitute a complete written description of all combinations and subcombinations of the embodiments described herein, and of the manner and process of making and using them, and shall support claims to any such combination or sub-combination. Additionally, some elements of the solid state downlights according to embodiments of the present invention are discussed in detail with reference to some embodiments and discussed in less detail with respect to other embodiments, It will be appreciated that the more-detailed discussion may apply to all embodiments except to the extent the context indicates otherwise.

The present invention has been described with reference to the accompanying drawings, in which embodiments of the invention are shown. However, this invention should not be construed as limited to the embodiments set forth herein. Rather, these embodiments are provided so that this disclosure will be thorough and complete, and will fully convey the scope of the invention to those skilled in the art. In the drawings, the thickness of layers and regions are exaggerated for clarity. Like numbers refer to like elements throughout. As used herein the term "and/or" includes any and all combinations of one or more of the associated listed items.

The terminology used herein is for the purpose of describing particular embodiments only and is not intended to be limiting of the invention. The singular forms "a", "an" and "the" are intended to include the plural forms as well, unless the context clearly indicates otherwise. It will be further understood that, when used in this specification, the terms "comprises" and/or "including" and derivatives thereof, specify the presence of stated features, operations, elements, and/or components, but do not preclude the presence or addition of one or more other features, operations, elements, components, and/or groups thereof.

It will be understood that, although the terms first, second, etc. may be used herein to describe various elements, components, regions and/or layers, these elements, components, regions and/or layers should not be limited by these terms. These terms are only used to distinguish one element, component, region or layer from another element, component, region or layer. Thus, a first element, component, region or layer discussed below could be termed a second element, component, region or layer without departing from the teachings of the present invention.

Furthermore, relative terms, such as "lower" or "bottom" and "upper" or "top," may be used herein to describe one element's relationship to another element as illustrated in the figures. It will be understood that relative terms are intended to encompass different orientations of the device in addition to the orientation depicted in the figures. For example, if the device in the figures is turned over, elements described as being on the "lower" side of other elements would then be oriented on "upper" sides of the other elements. The exemplary term "lower", can therefore, encompasses both an orientation of "lower" and "upper," depending on the particular orientation of the figure.

In the drawings and specification, there have been disclosed embodiments of the invention and, although specific terms are employed, they are used in a generic and descriptive sense only and not for purposes of limitation, the scope of the invention being set forth in the following claims.

What is claimed is:
1. A solid state downlight, comprising:
   a fixture that includes:
      a solid state lighting housing;
      a plurality of light emitting diodes within the solid state lighting housing; and
      a junction box; and
   at least one mounting structure that is configured to releasably attach the fixture directly to a ceiling to mount the fixture within an opening in the ceiling,
   wherein the at least one mounting structure comprise a pair of spring mounting arms, and wherein the solid state lighting housing includes a lip that is at least partially below the ceiling when the solid state downlight is installed in the ceiling, and
   wherein each spring mounting arm includes a spring section that directly engages a sidewall of the opening in the ceiling.

2. The solid state downlight of claim 1, wherein the junction box is mounted above the solid state lighting housing, the solid state downlight further comprising a driver housing that includes a driver circuit that is mounted above the solid state lighting housing.

3. The solid state downlight of claim 2, wherein the junction box and the driver housing are mounted side-by-side on a top surface of the solid state lighting housing.

4. The solid state downlight of claim 3, wherein a top surface of the junction box overlies the driver housing.

5. The solid state downlight of claim 1, wherein the junction box includes a first wire opening with a resiliently deflectable cover.

6. The solid state downlight of claim 5, wherein the resiliently deflectable cover is configured to engage an external electrical wire that enters the junction box through the wire opening to provide strain relief.

7. The solid state downlight of claim 1, wherein the spring mounting arms are configured to hold the fixture within the opening for ceilings having thickness in the range from about 0.375 inches to about 0.675 inches.

8. The solid state downlight of claim 2, further comprising a wire connection terminal that is at least partly within the junction box, the wire connection terminal configured to connect a power supply conductor and a return conductor of an external electrical wire to respective ones of a pair of electrical leads that are connected to the driver circuit.

9. The solid state downlight of claim 2, wherein the junction box is mounted to the fixture via a flexible wire conduit, wherein a pair of electrical leads that are connected to the driver circuit extend from the driver circuit through the flexible wire conduit to the junction box.

10. A solid state downlight fixture for mounting within an opening in a ceiling, comprising:
   a solid state lighting housing having a top surface, at least one sidewall extending downwardly from the top surface and a lower lip extending outwardly from the bottom of the at least one sidewall;
   a plurality of light emitting diodes mounted within the solid state lighting housing;
   a junction box releasably attached to the top surface of the solid state lighting housing, the junction box including a wire opening;
   a driver housing on the top surface of the solid state lighting housing;
   at least one mounting structure that is attached to the junction box and/or the driver housing and is configured to releasably attach the fixture directly to the ceiling to mount the fixture within the opening in the ceiling;
   and a driver circuit in the driver housing, the driver circuit including first and second leads that extend into the junction box; and wherein the at least one mounting structure comprise a pair of spring mounting arms that are configured to directly engage a sidewall of the opening in the ceiling when the solid state downlight fixture is mounted within the opening in the ceiling, and wherein the solid state lighting housing includes a lip that is mounted at least partially below the ceiling.

11. The solid state downlight fixture of claim 10, further comprising a resiliently deflectable cover that covers the wire opening, the deflectable cover configured to engage an external electrical wire that is routed through the wire opening to provide strain relief.

12. The solid state downlight fixture of claim 11, wherein the junction box includes a second wire opening and a second resiliently deflectable cover that covers the second wire opening.

13. The solid state downlight fixture of claim 10,
   wherein the junction box and the driver housing are arranged side-by-side on the top surface of the solid state lighting housing, and
   wherein a top surface of the junction box overlies the driver housing.

14. The solid state downlight of claim 1, wherein the solid state downlight is configured to be mounted in the ceiling and electrically connected to an external electrical wire that provides power to the solid state downlight without installing a sheet metal lighting can in the ceiling.

15. The solid state downlight of claim 2, wherein the junction box comprises an extension that covers a top surface of the driver housing.

16. The solid state downlight of claim 15, wherein the extension comprises a downwardly projecting finger having an inwardly projecting tab that is configured to fit within an opening of the driver housing.

17. The solid state downlight of claim 2, wherein the at least one mounting structure is attached to the junction box and/or the driver housing.

18. The solid state downlight fixture of claim 13, wherein the junction box comprises an extension that covers a top surface of the driver housing.

19. The solid state downlight fixture of claim 18, wherein the extension comprises a downwardly projecting finger having an inwardly projecting tab that is configured to fit within an opening of the driver housing.

* * * * *

UNITED STATES PATENT AND TRADEMARK OFFICE
CERTIFICATE OF CORRECTION

| | |
|---|---|
| PATENT NO. | : 10,054,274 B2 |
| APPLICATION NO. | : 14/699172 |
| DATED | : August 21, 2018 |
| INVENTOR(S) | : Athalye et al. |

Page 1 of 1

It is certified that error appears in the above-identified patent and that said Letters Patent is hereby corrected as shown below:

On the Title Page

Item (63) Related U.S. Application Data:
Please correct "application No. 13/787,727, filed on Mar. 3, 2013," to read -- application No. 13/787,727, filed on Mar. 6, 2013, --

Signed and Sealed this
Eleventh Day of December, 2018

Andrei Iancu
*Director of the United States Patent and Trademark Office*